United States Patent
Murata et al.

(10) Patent No.: US 9,841,643 B2
(45) Date of Patent: Dec. 12, 2017

(54) LIQUID CRYSTAL DISPLAY APPARATUS

(71) Applicant: Sharp Kabushiki Kaisha, Osaka (JP)

(72) Inventors: Mitsuhiro Murata, Osaka (JP); Yosuke Iwata, Osaka (JP); Hidefumi Yoshida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/905,439

(22) PCT Filed: Jul. 7, 2014

(86) PCT No.: PCT/JP2014/068005
§ 371 (c)(1),
(2) Date: Jan. 15, 2016

(87) PCT Pub. No.: WO2015/012092
PCT Pub. Date: Jan. 29, 2015

(65) Prior Publication Data
US 2016/0161809 A1    Jun. 9, 2016

(30) Foreign Application Priority Data
Jul. 24, 2013  (JP) .................................. 2013-153839

(51) Int. Cl.
*G02F 1/1343* (2006.01)
*G02F 1/1333* (2006.01)
*G02F 1/1337* (2006.01)

(52) U.S. Cl.
CPC .. *G02F 1/134363* (2013.01); *G02F 1/133345* (2013.01); *G02F 2001/133749* (2013.01)

(58) Field of Classification Search
CPC ................................................ G02F 1/134363
See application file for complete search history.

(56) References Cited

U.S. PATENT DOCUMENTS 6,583,839 B2 *   6/2003   Suzuki .............. G02F 1/134363
                                                 349/141
7,206,051 B2 *   4/2007   Lee ................... G02F 1/134363
                                                 349/141
(Continued)

FOREIGN PATENT DOCUMENTS

JP       2002-365657 A    12/2002
JP       2007-183583 A     7/2007
(Continued)

*Primary Examiner* — Kendrick Hsu
(74) *Attorney, Agent, or Firm* — Chen Yoshimura LLP

(57) ABSTRACT

A liquid crystal display device includes: a first substrate; a second substrate; and a liquid crystal layer of a horizontal orientation type that is sandwiched between the first substrate and the second substrate. The first substrate includes a first electrode pair that applies a first horizontal electric field to the liquid crystal layer, an insulating layer provided on the first electrode pair, and a second electrode pair that is provided on the insulating layer and that applies a second horizontal electric field to the liquid crystal layer. The first electrode pair includes first and second linear electrodes provided with a gap therebetween. The second electrode pair includes third and fourth linear electrodes provided with a gap therebetween. In a plan view of the first substrate, the third and fourth linear electrodes extend in a direction perpendicular with respect to the first and second linear electrodes.

8 Claims, 16 Drawing Sheets

(56) References Cited

U.S. PATENT DOCUMENTS

| | | | |
|---|---|---|---|
| 8,400,603 B2* | 3/2013 | Yoso | G02F 1/1323 349/138 |
| 2002/0054251 A1* | 5/2002 | Maruyama | G02F 1/1334 349/88 |
| 2003/0098945 A1* | 5/2003 | Sugimoto | G02F 1/133504 349/172 |
| 2007/0126969 A1 | 6/2007 | Kimura et al. | |
| 2007/0252938 A1 | 11/2007 | Choi et al. | |
| 2014/0132644 A1 | 5/2014 | Rossini | |
| 2014/0132906 A1 | 5/2014 | Yoshioka et al. | |

FOREIGN PATENT DOCUMENTS

| | | |
|---|---|---|
| JP | 2007-298983 A | 11/2007 |
| JP | 2009-86576 A | 4/2009 |
| WO | 2012/175250 A1 | 12/2012 |
| WO | 2013/001980 A1 | 1/2013 |

\* cited by examiner

LIQUID CRYSTAL DISPLAY APPARATUS

TECHNICAL FIELD

The present invention relates to a liquid crystal display device. More specifically, the present invention relates to a liquid crystal display device suitable for a horizontal alignment mode liquid crystal display device.

BACKGROUND ART

Liquid crystal display devices have undergone rapid development due to certain benefits, such as being lightweight, thin, and having low power consumption. In recent years, FFS (fringe field switching) mode has become well-known as a liquid crystal mode in liquid crystal display devices that are widely used in portable electronic devices such as smartphones, tablet PCs, and the like.

FFS mode liquid crystal display devices normally include: a substrate having a two-layer electrode structure; a substrate disposed so as to face the aforementioned substrate; and a liquid crystal layer of a horizontal orientation type that is sandwiched between the two substrates. The two-layer electrode structure includes: an upper electrode and a lower electrode formed from transparent conductive materials such as ITO (indium tin oxide) and IZO (indium zinc oxide); and an insulating layer sandwiched between these two electrode layers. A fringe electric field is then generated between the upper electrode and the lower electrode, and the liquid crystal layer is driven via this fringe electric field.

Research has also been conducted regarding liquid crystal display devices that use other types of liquid crystal modes. Patent Document 1, for example, discloses a liquid crystal display device in which: a liquid crystal layer formed of liquid crystal having a positive dielectric anisotropy is sandwiched between a pair of substrates disposed so as to face each other; a pixel electrode and a common electrode, which apply a vertical electric field to the liquid crystal layer, are respectively provided on an element substrate and an opposite substrate; and a comb-shaped electrode, which applies a horizontal electric field to the liquid crystal layer between the comb-shaped electrode and the pixel electrode, is provided above the pixel electrode on the element substrate with an insulating film therebetween.

In addition, Patent Document 2, for example, discloses a liquid crystal display device that has a color filter substrate and an array substrate on which thin film transistors have been provided at respective intersections of signal lines and scan lines arranged in a matrix. This liquid crystal display device has protrusions and recesses in a planarizing film on the array substrate side.

RELATED ART DOCUMENTS

Patent Documents

Patent Document 1: Japanese Patent Application Laid-Open Publication No. 2002-365657
Patent Document 2: Japanese Patent Application Laid-Open Publication No. 2009-86576

SUMMARY OF THE INVENTION

Problems to be Solved by the Invention

However, there has been a problem with conventional FFS mode liquid crystal displays in that the response speed in switching from ON to OFF is slow. This is due to the fact that in FFS mode the liquid crystal molecules are returned to their initial orientation state by stopping the application of voltage. This change occurs as a result of the viscosity of the liquid crystal itself, meaning that the viscosity of the liquid crystal affects the response speed.

Patent Document 1 discloses a liquid crystal display device which can improve response speed. However, this liquid crystal display device, in a manner similar to a TN (twisted nematic) mode, drives the liquid crystal layer by utilizing an electric field in a direction perpendicular to the substrate (a vertical electric field), which means that the viewing angle characteristics will degrade.

Furthermore, Patent Document 2 discloses a display device in which it is possible realize high-speed responsiveness by providing protrusions and recesses. However, since this device still uses the viscosity of the liquid crystal itself to switch the display from ON to OFF, there is still room for improvement regarding the response speed of the liquid crystal display device disclosed in Patent Document 2.

The present invention takes into consideration the above-mentioned circumstances, and an aim of the present invention is to provide a liquid crystal display device with high-speed responsiveness and wide viewing angle characteristics.

Means for Solving the Problems

According to one aspect of the present invention, the present invention may be a liquid crystal display device that includes a first substrate; a second substrate facing the first substrate; and a liquid crystal layer of a horizontal orientation type that is sandwiched between the first substrate and the second substrate, wherein the first substrate may include a first electrode pair that applies a first horizontal electric field to the liquid crystal layer, an insulating layer provided on the first electrode pair, and a second electrode pair that is provided on the insulating layer and that applies a second horizontal electric field to the liquid crystal layer, wherein the first electrode pair may include a first linear electrode and a second linear electrode provided with a gap therebetween, wherein the second electrode pair may include a third linear electrode and a fourth linear electrode provided with a gap therebetween, and wherein, in a plan view of the first substrate, the third linear electrode and the fourth linear electrode may extend in a direction perpendicular with respect to the first linear electrode and the second linear electrode.

Hereafter, such a liquid crystal display device is referred to as a liquid crystal display device of the present invention.

The phrase "the third linear electrode and the fourth linear electrode extend in a direction perpendicular to the first linear electrode and the second linear electrode in a plan view of the first substrate" means more specifically that, in a plan view of the first substrate, the third linear electrode and the fourth linear electrode respectively extend in a direction that forms an angle of 75° to 90° with respect to the respective extension directions (lengthwise directions) of the first linear electrode and the second linear electrode.

Descriptions of preferred embodiments of a liquid crystal display device of the present invention will be provided below. The preferred embodiments described below may be appropriately combined, and an embodiment in which two or more of the preferred embodiments described below are combined is also considered to be a preferred embodiment.

The first linear electrode may be provided in parallel to the second linear electrode, and the third linear electrode may be provided in parallel to the fourth linear electrode.

The first, second, third, and fourth linear electrodes may respectively be a portion of an electrode, or in other words, a linear portion of an electrode. The first, second, third, and fourth linear electrodes may respectively be a linear portion (tooth portion) of a comb-shaped electrode, for example.

The liquid crystal layer may include liquid crystal having a positive dielectric anisotropy.

In such cases, an initial orientation direction of liquid crystal molecules included in the liquid crystal layer may form an angle of 15° (preferably 7°) or less with respect to respective extension directions of the first linear electrode and the second linear electrode or respective extension directions of the third linear electrode and the fourth linear electrode.

There is no particular minimum value for the above-mentioned angle as long as it is greater than 0°. The angle may be greater than or equal to 1°.

The "initial orientation direction of the liquid crystal molecules" refers to the long-axis direction of the liquid crystal molecules in a plan view when an electric field has not been generated within the liquid crystal layer by the first and second electrode pairs.

The liquid crystal layer may include liquid crystal having a negative dielectric anisotropy.

The gap between the first linear electrode and the second linear electrode may be 7 µm or less (preferably 6 µm or less).

The gap between the third linear electrode and the fourth linear electrode may be 7 µm or less (preferably 6 µm or less).

There are no particular restrictions regarding the minimum size of the gap between the first linear electrode and the second linear electrode. The gap may be greater than or equal to 2 µm (preferably greater than or equal to 3 µm).

While there are no particular restrictions regarding the minimum size of the gap between the third linear electrode and the fourth linear electrode, the gap may be greater than or equal to 2 µm (preferably greater than or equal to 3 µm).

Effects of the Invention

According to the present invention, it is possible to realize a liquid crystal display device with high-speed responsiveness and wide viewing angle characteristics.

DETAILED DESCRIPTION OF EMBODIMENTS

Embodiments are described below and the present invention is described in further detail with reference to the drawings, but the present invention is not limited to these embodiments.

Embodiment 1

Figure 1:
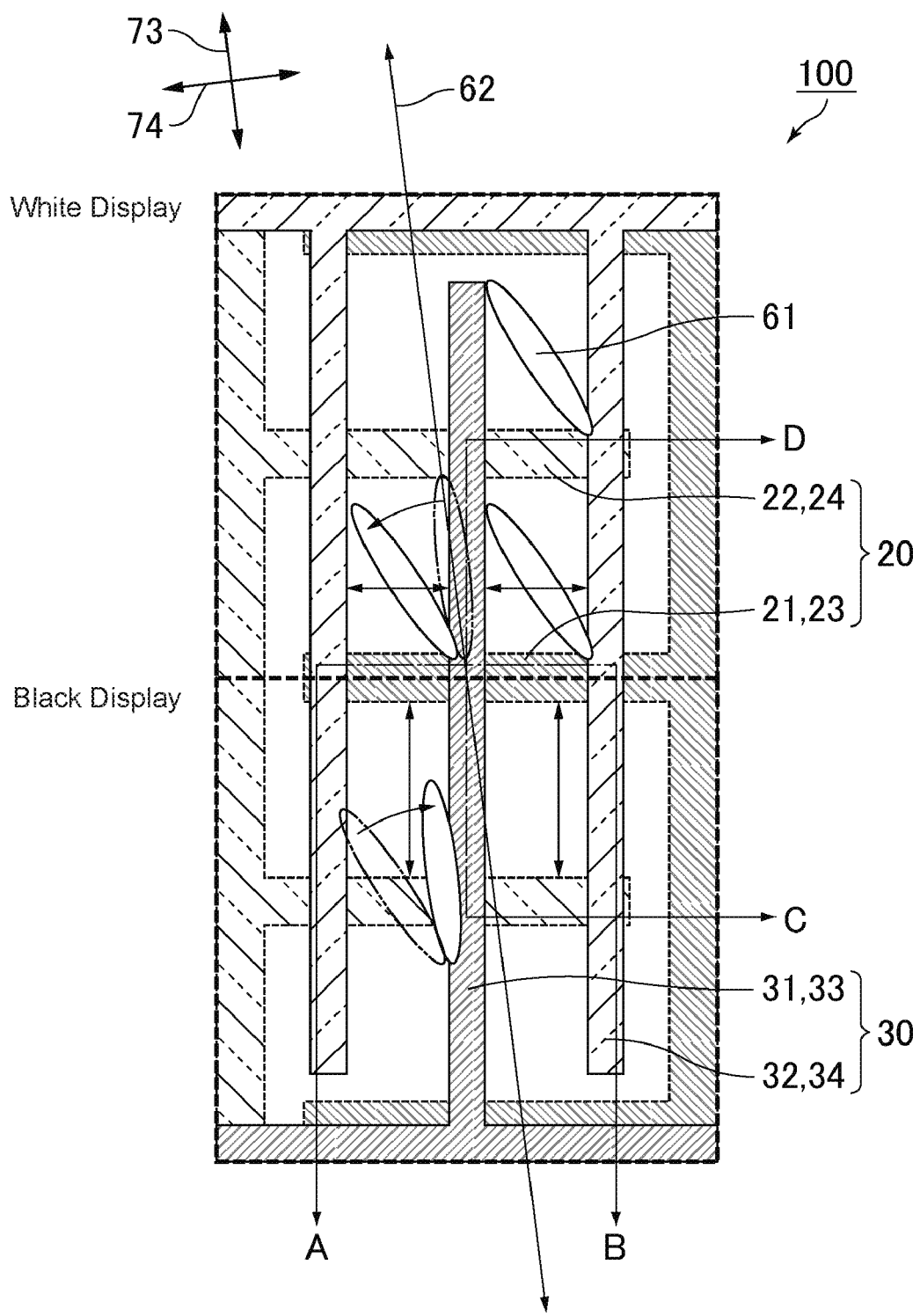
FIG. 1 is a schematic plan view of a sub-pixel in a liquid crystal display device of Embodiment 1.
Figure 2:
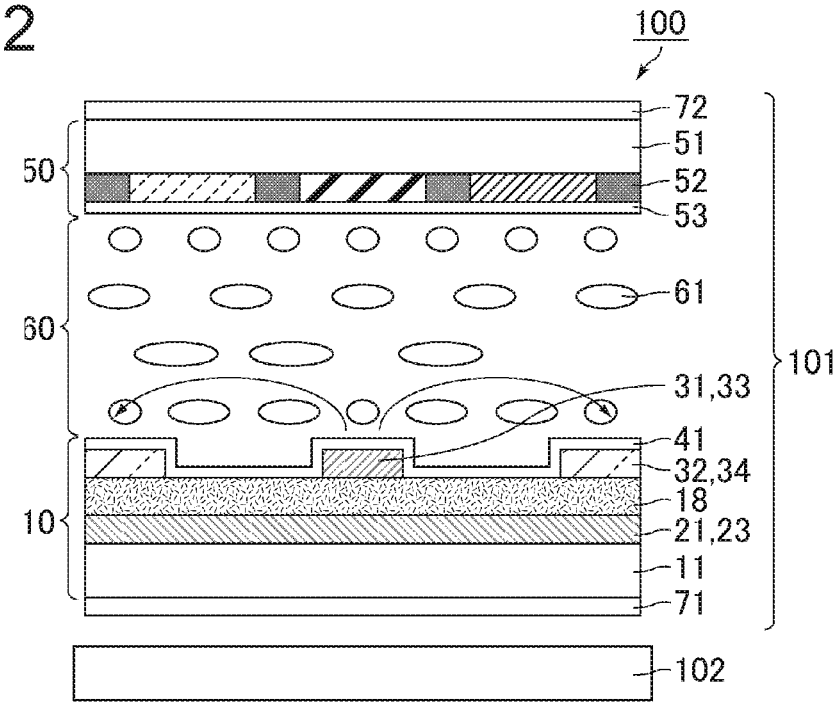
FIG. 2 is a schematic cross-sectional view of the liquid crystal display device of Embodiment 1, and corresponds to a cross-section along a line A-B in FIG. 1.
Figure 3:
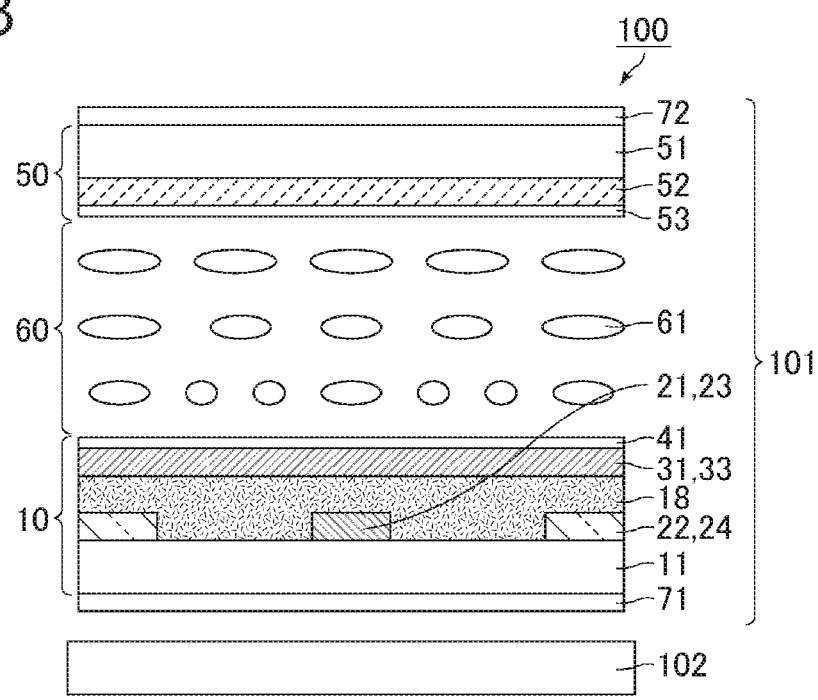
FIG. 3 is a schematic cross-sectional view of the liquid crystal display device of Embodiment 1, and corresponds to a cross-section along a line C-D in FIG. 1.
Figure 4:
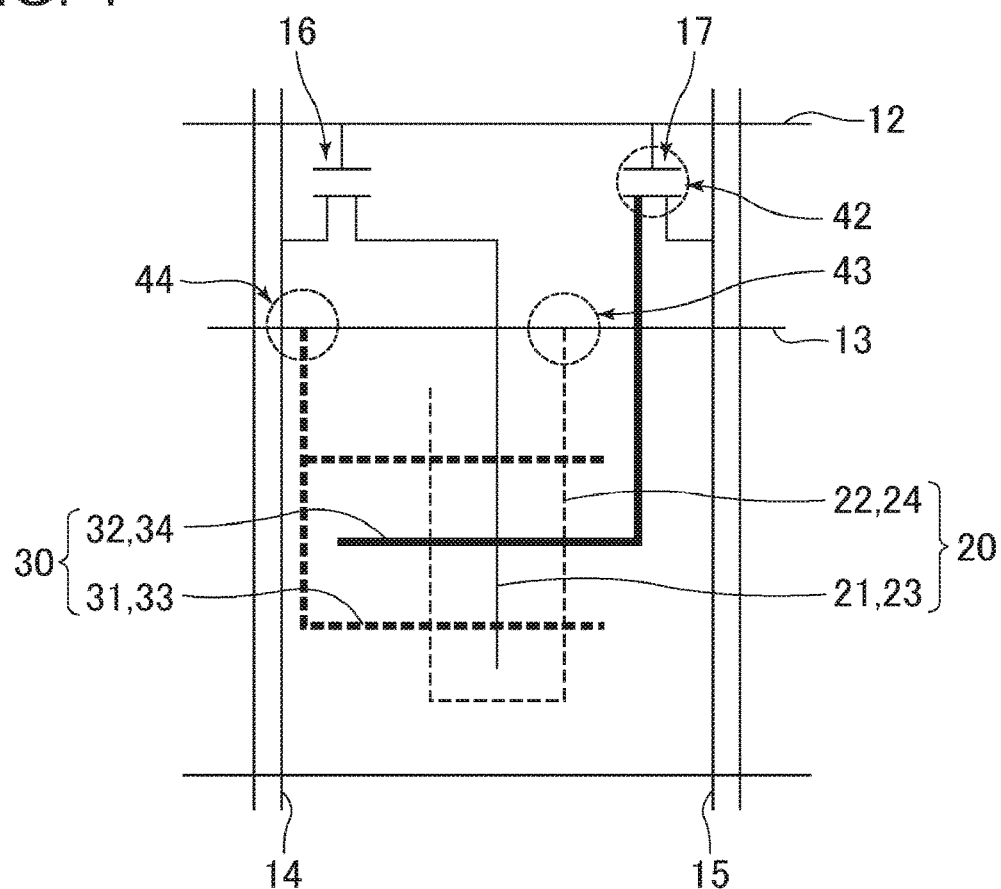
FIG. 4 is a schematic diagram of a circuit configuration of a sub-pixel in the liquid crystal display device of Embodiment 1.

FIG. 1 is a schematic plan view of a sub-pixel in a liquid crystal display device of Embodiment 1. FIG. 2 is a schematic cross-sectional view of the liquid crystal display device of Embodiment 1, and corresponds to a cross-section along a line A-B in FIG. 1. FIG. 3 is a schematic cross-sectional view of the liquid crystal display device of Embodiment 1, and corresponds to a cross-section along a line C-D in FIG. 1. FIG. 4 is a schematic diagram of a circuit configuration of a sub-pixel in the liquid crystal display device of Embodiment 1. The upper half of FIG. 1 shows a state (hereafter referred to as a "rising period") in which a display has been switched from a low gradation (black (the minimum gradation), for example) to a high gradation (white (the maximum gradation), for example). The lower half of FIG. 1 shows a state (hereafter referred to as a "falling period") in which the display has been switched from a high gradation (white (the maximum gradation), for example) to a low gradation (black (the minimum gradation), for example).

As shown in FIGS. 2 and 3, a liquid crystal display device 100 of the present embodiment includes: a liquid crystal panel 101; a backlight unit 102 provided to the rear of the liquid crystal panel 101; and a control unit (not shown) that drives and controls the liquid crystal panel 101 and the backlight unit 102.

The liquid crystal panel 101 has: an array substrate (active matrix substrate) 10 that corresponds to the above-mentioned first substrate; an opposite substrate 50 that corresponds to the above-mentioned second substrate and that faces the array substrate 10; a liquid crystal layer 60 sandwiched between the array substrate 10 and the opposite substrate 50; and a pair of polarizing plates 71, 72 respectively disposed on respective main surfaces of the substrates 10, 50 that are opposite to the liquid crystal layer 60. The array substrate 10 and the opposite substrate 50 are respectively provided on the back side and the viewer side of the liquid crystal display device 100. The polarizing plates 71, 72 are disposed in a crossed Nicols state.

The substrates 10, 50 are bonded together via a sealing member (not shown) provided so as to surround a display region. The substrates 10, 50 also face each other through spacers (not shown) such as column-shaped spacers. The liquid crystal layer 60 is then formed as an optical modulation layer by sealing liquid crystal material in a gap between the substrates 10, 50.

The array substrate 10 includes an insulating substrate 11 that is colorless and transparent, and that is formed of a material such as glass or plastic. As shown in FIGS. 1 to 4, the following are formed on a main surface on a liquid crystal layer 60 side of the insulating substrate 11: a plurality of gate bus lines 12 that are parallel to one another; a plurality of common wiring lines 13 provided in parallel to the gate bus lines 12; a plurality of first and second source bus lines 14, 15 that are orthogonal to the gate bus lines 12 and the common wiring lines 13; first and second thin film transistors (TFTs) 16, 17 that are switching elements, and that are respectively provided in each sub-pixel; an interlayer insulating film (not shown); a first electrode pair 20 provided on the interlayer insulating film in each sub-pixel; an insulating layer 18 that covers the first electrode pair 20; a second electrode pair 30 provided on the insulating layer 18 in each sub-pixel; and a horizontal alignment film 41. A region that is defined by the gate bus lines 12, a first source bus line 14, and a second source bus line 15 forms approximately one sub-pixel.

The first electrode pair 20 includes: a comb-shaped first pixel electrode 21; and a comb-shaped first opposite electrode 22. The first pixel electrode 21 has: a plurality of first linear portions (tooth-shaped portions) 23 that correspond to the first linear electrodes; and a portion (shaft portion) that connects the first linear portions 23 to each other. The first opposite electrode 22 has: a plurality of second linear portions (tooth-shaped portions) 24 that correspond to the second linear electrodes; and a portion (shaft portion) that connects the second linear portions 24 to each other. The first pixel electrode 21 and the first opposite electrode 22 are disposed such that the first linear portions 23 and the second linear portions 24 interlock with each other with a prescribed gap (space) therebetween. The first linear portions 23 and the second linear portions 24 are also alternately disposed. In addition, the first linear portions 23 and the second linear portions 24 are disposed parallel to each other. The first linear portions 23 and the second linear portions 24 are formed in a straight line in the left-right direction.

The second electrode pair 30 includes: a comb-shaped second pixel electrode 31; and a comb-shaped second opposite electrode 32. The second pixel electrode 31 has: a plurality of third linear portions (tooth-shaped portions) 33 that correspond to the third linear electrodes; and a portion (shaft portion) that connects the third linear portions 33 to each other. The second opposite electrode 32 has: one or more fourth linear portions (tooth-shaped portions) 34 that correspond to the fourth linear electrodes; and a portion (shaft portion) that connects the fourth linear portions 34 to each other. The second pixel electrode 31 and the second opposite electrode 32 are disposed such that the third linear portions 33 and the fourth linear portions 34 interlock with each other with a prescribed gap (space) therebetween. The third linear portions 33 and the fourth linear portions 34 are also alternately disposed. In addition, the third linear portions 33 and the fourth linear portions 34 are disposed parallel to each other. The third linear portions 33 and the fourth linear portions 34 are formed in a straight line in the up-down direction.

There are no particular restrictions regarding the number of the linear portions 23, 24, 33, 34 as long as there are one or more of each, and the number of linear portions can be set as appropriate. In addition, there are no particular restrictions regarding the orientation of the respective linear portions 23, 24, 33, 34. The first linear portions 23 and the second linear portions 24 may be arranged in the up-down direction, and the third linear portions 33 and the fourth linear portions 34 may be arranged in the left-right direction, for example.

When the array substrate 10 is seen in a plan view, the respective third linear portions 33 and fourth linear portions 34 extend in a direction perpendicular to the extension directions (lengthwise directions) of the respective first linear portions 23 and second linear portions 24. Qualitatively, the respective third linear portions 33 and fourth linear portions 34 are formed at an angle of 75° to 90° with respect to the respective extension directions (lengthwise directions) of the first linear portions 23 and the second linear portions 24.

The fourth linear portions 34 may be disposed so as to overlap the shaft portion of the lower first electrode pair 20.

The first TFT 16 is provided near an intersection of the gate bus line 12 and the first source bus line 14. The gate of the first TFT 16 is electrically connected to the gate bus line 12, the source of the first TFT 16 is electrically connected to the first source bus line 14, and the drain of the first TFT 16 is electrically connected to the first pixel electrode 21. The first pixel electrode 21 is driven via the first source bus line 14.

The second TFT 17 is provided near an intersection of the gate bus line 12 and the second source bus line 15. The gate of the second TFT 17 is electrically connected to the gate bus line 12, the source of the second TFT 17 is electrically connected to the second source bus line 15, and the drain of the second TFT 17 is electrically connected to the second pixel electrode 31 via a contact hole 42. The second pixel electrode 31 is driven via the second source bus line 15.

The first opposite electrode 22 is electrically connected to the common wiring line 13 via a contact hole 43, and the second opposite electrode 32 is electrically connected to the common wiring line 13 via a contact hole 44.

The source bus lines 14, 15 are connected to a source driver (not shown) outside the display region. The gate bus line 12 is connected to a gate driver (not shown) outside the display region. Scan signals are provided in pulses at a prescribed timing from the gate driver to the gate bus line 12, and these scan signals are applied to the respective TFTs 16, 17 in a line-sequential manner. The common wiring lines 13 electrically connect to each other outside the display region. A prescribed voltage (an AC voltage or DC voltage of 5V, for example) is applied to the common wiring lines 13.

Looking at the cross-sectional structure of the array substrate 10, a layer (not shown; hereafter referred to as an element formation layer) that includes the gate bus lines 12, the common wiring lines 13, the source bus lines 14, 15, the TFTs 16, 17, the interlayer insulating film, and the like is formed on the insulating substrate 11. The gate bus lines 12 and the common wiring lines 13 are formed from the same conductive film during the same step. The first electrode pair 20, or in other words, the first linear portion 23 and the second linear portion 24, are both formed on the interlayer insulating film, and the insulating layer 18 is formed on the first electrode pair 20. The second electrode pair 30, or in other words, the third linear portion 33 and the fourth linear portion 34, are both formed on the insulating layer 18. The insulating layer 18 covers the first electrode pair 20, and electrically insulates the first electrode pair 20 from the second electrode pair 30. The first linear portion 23 and the second linear portion 24 are formed from the same conductive film during the same step, and the third linear portion 33 and the fourth linear portion 34 are formed from the same conductive film during the same step.

The opposite substrate 50 includes an insulating substrate 51 that is colorless and transparent, and that is formed of a material such as glass or plastic. A color filter layer 52 and a horizontal alignment film 53 are stacked in this order on the main surface on the liquid crystal layer 60 side of the insulating substrate 51.

Nematic liquid crystal that has positive dielectric anisotropy ($\Delta\epsilon>0$) is used as the material for the liquid crystal layer 60. There are no particular restrictions regarding a specific value for the dielectric anisotropy $\Delta\epsilon$ of the nematic liquid crystal; however, it is preferable that $\Delta\epsilon$ be between 3 and 15, with 5 to 10 being especially preferable. Liquid crystal molecules 61 that make up the nematic liquid crystal exhibit parallel alignment (horizontal alignment, homeotropic alignment) when an electric field is not generated within the liquid crystal layer 60 by the electrode pairs 20, 30 (hereafter referred to as a "non-electric field period") due to orientation restraining force by the horizontal alignment films 41, 53. The liquid crystal molecules 61 are aligned such that the long axes thereof are substantially parallel to the main surfaces of the substrates 10, 50. During non-electric field periods, it is preferable that the pre-tilt angle of the liquid crystal layer 60 be between 0° and 3°, with 0° to 2° being even more preferable. If the pre-tilt angle is greater than or equal to 0°, it is possible to use a photoalignment film as the horizontal alignment films 41, 53. This is due to the fact that the pre-tilt angle of photoalignment films, which have recently been used in the production of liquid crystal display devices, is greater than or equal to 0°. If the pre-tilt angle exceeds 2°, there is a chance that the viewing angle characteristics may degrade. It is possible to prevent a degradation in view from oblique angles as the pre-tilt angle becomes smaller. It is possible to use alignment films that will undergo rubbing treatment as the horizontal alignment films 41, 53. In such cases, the pre-tilt angle of the liquid crystal layer 60 is usually greater than 0°. In addition, during non-electric field periods, the liquid crystal molecules 61 are aligned in a prescribed direction. The long axis direction of the liquid crystal molecules is substantially identical to the direction of the alignment treatment (the rubbing direction, for example) during non-electric field periods.

When the long-axis direction of the liquid crystal molecules 61 is the same as the initial orientation direction 62 in a plan view during a non-electric field period, it is preferable that the angle formed between the initial orientation direction 62 and the extension direction (lengthwise direction) of the respective linear portions 33, 34 be less than or equal to 15°, with 7° or less being even more preferable. In addition, it is preferable that the angle formed between the initial orientation direction 62 and the extension direction (lengthwise direction) of the respective linear portions 33, 34 be greater than or equal to 1°.

In a plan view, one transmission axis 73 of the polarizing plates 71, 72 disposed in a crossed Nicols state is parallel to the initial orientation direction 62, and another transmission axis 74 is orthogonal to the initial orientation direction 62. Thus, the present embodiment realizes a normally black mode, and during non-electric field periods, the transmittance ratio becomes the lowest possible value, or in other words, a black screen is displayed. During non-electric field periods, light emitted from the backlight unit 102 is converted to polarized light, such as linearly-polarized light, by passing through the polarizing plate 71. The polarized light then passes through the liquid crystal layer 60 with very little change in the polarization state, and is then blocked by the polarizing plate 72.

The TFTs 16, 17 turn ON for a fixed period of time when scan signals are input. Signals (voltage) that correspond to a gradation are applied from the first source bus lines 14 to each of the respective first pixel electrodes 21 (each of the sub-pixels) via the first TFTs 16. In addition, signals (voltage) that correspond to a gradation are applied from the second source bus lines 15 to each of the respective second pixel electrodes 31 (each of the sub-pixels) via the second TFTs 17.

Meanwhile, the opposite electrodes 22, 32 are electrodes (common electrodes) for applying common voltage (signals) to all of the pixels and sub-pixels. In the opposite electrodes 22, 32, a prescribed common voltage (an AC or DC voltage of 5V, for example) is applied from the common wiring lines 13 to all of the pixels and subpixels.

When voltages of differing magnitude are applied to the first pixel electrode 21 and the first opposite electrode 22, and voltages of the same magnitude as that applied to the first opposite electrode 22 are applied to the second pixel electrode 31 and the second opposite electrode 32, a first horizontal electric field, which is substantially parallel to the respective main surfaces of the substrates 10, 50, is formed between the first pixel electrode 21 and the first opposite electrode 22. The first horizontal electrode field is generated in a direction substantially orthogonal to the extension directions (lengthwise directions) of the first linear portion 23 and the second linear portion 24.

When voltages of differing magnitude are applied to the second pixel electrode 31 and the second opposite electrode 32, and voltages of the same magnitude as applied to the second opposite electrode 32 are applied to the first pixel electrode 21 and the first opposite electrode 22, a second horizontal electric field, which is substantially parallel to the respective main surfaces of the substrates 10, 50, is formed between the second pixel electrode 31 and the second opposite electrode 32. The second horizontal electrode field is generated in a direction substantially orthogonal to the extension directions (lengthwise directions) of the third linear portion 33 and the fourth linear portion 34, and is substantially orthogonal to the first horizontal electric field.

By applying the first or the second horizontal electric field to the liquid crystal layer 60, it is possible to rotate the liquid crystal molecules 61, which have a positive dielectric anisotropy, in a plane substantially parallel to the respective main surfaces of the substrates 10, 50. When the second horizontal electric field is applied, the liquid crystal molecules 61 having positive dielectric anisotropy are rotated such that the long-axis direction thereof approaches the direction of the second horizontal electric field (the direction of lines of electric force), or in other words, such that the long-axis direction thereof moves away from the initial orientation direction 62.

Meanwhile, when the first horizontal electric field is applied, the liquid crystal molecules 61 having positive dielectric anisotropy are rotated such that the long-axis direction thereof approaches the direction of the first horizontal electric field (the direction of lines of electric force), or in other words, such that the long-axis direction thereof approaches the initial orientation direction 62. In this manner, by appropriately modifying the voltage applied to the first electrode pair 20 and the second electrode pair 30, the alignment of the liquid crystal molecules 61 in each sub-pixel is controlled, and the transmittance of light emitted from the backlight unit 102 is controlled in each sub-pixel. As a result, images are displayed in the display region.

When the display is switched from a low gradation (black (the minimum gradation), for example) to a high gradation (white (the maximum gradation), for example) [a rising period], the second horizontal electric field is applied to the liquid crystal layer 60 via the upper second electrode pair 30, thus causing the liquid crystal molecules 61 to rotate away from the initial orientation direction 62. During rising periods, a distorted electric field is generated between the lower first electrode pair 20 and the upper second electrode pair 30 when the first electrode pair 20 is electrically insulated (a floating state) or when differing voltages are applied to the first pixel electrode 21 and the first opposite electrode 22. Thus, during rising periods, it is preferable that the first pixel electrode 21 and the first opposite electrode 22 be set to substantially the same potential.

Conversely, when the display is switched from a high gradation (white (the maximum gradation), for example) to a low gradation (black (the minimum gradation), for example) [a falling period], the first horizontal electric field is applied to the liquid crystal layer 60 via the lower first electrode pair 20, thus causing the liquid crystal molecules 61 to rotate so as to approach the initial orientation direction 62. During falling periods, a distorted electric field is generated between the lower first electrode pair 20 and the upper second electrode pair 30 when the second electrode pair 30 is electrically insulated (a floating state) or when differing voltages are applied to the second pixel electrode 31 and the second opposite electrode 32. Thus, during falling periods, it is preferable that the second pixel electrode 31 and the second opposite electrode 32 be set to substantially the same potential.

In addition, voltage is continuously applied to the same electrode pair (either the first electrode pair 20 or the second electrode pair 30) when the gradation is sequentially driven toward a high gradation or low gradation. Examples of such a situation include instances when the gradation is changed from black to a low gradation close to black and then changed to a high gradation, as well as instances in which the gradation is changed from white to a high gradation close to white and then changed to a low gradation, for example.

In this manner, all changes in gradation can be controlled by applying voltage to the first electrode pair 20 or the second electrode pair 30, regardless of the properties, including the viscosity, of the liquid crystal. Thus, it is possible to achieve high-speed responsiveness during all gradation changes.

Figure 5:
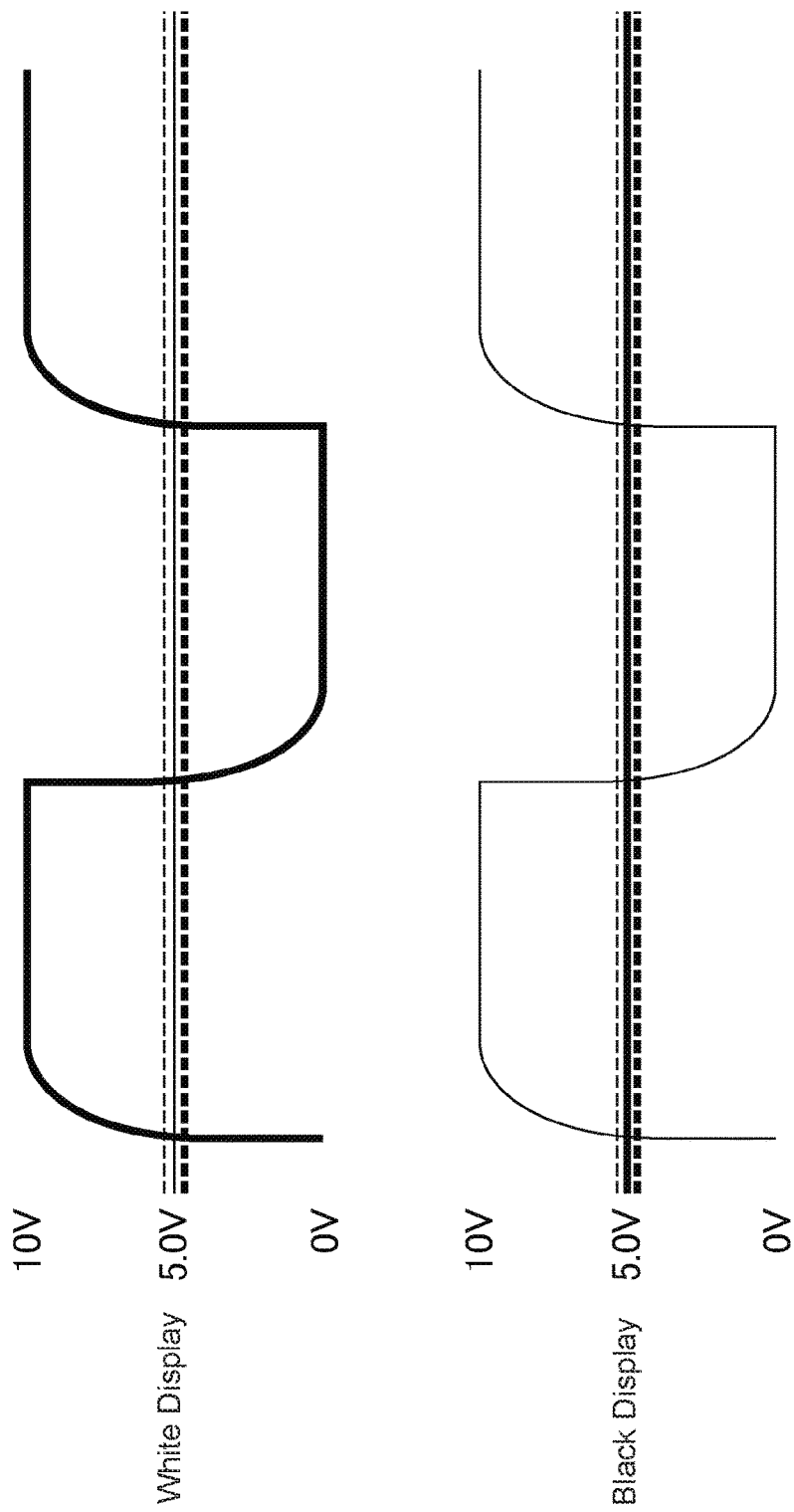
FIG. 5 is a timing chart of the liquid crystal display device of Embodiment 1.

FIG. 5 is a timing chart of the liquid crystal display device of Embodiment 1.

As shown in the top portion of FIG. 5, during white display, it is possible to effectively apply a first horizontal electric field of ±5V to the liquid crystal layer 60 by driving the upper second pixel electrode 31 (the thick solid line) at 0V and 10V, and setting the second opposite electrode 32 (thick dashed line), the first pixel electrode 21 (thin solid line), and the first opposite electrode 22 (thin dashed line) to 5V, for example. In addition, it is possible to change the gradation from a low gradation to halftone, and then from halftone to white by changing the voltage applied to the second pixel electrode 31, such as increasing the voltage between the second pixel electrode 31 and the second opposite electrode 32 from ±2V to ±4V and from ±4V to ±5V.

As shown in the bottom portion of FIG. 5, during black display, it is possible to effectively apply a second horizontal electric field of ±5V to the liquid crystal layer 60 by driving the lower first pixel electrode 21 (the thin solid line) at 0V and 10V, and setting the first opposite electrode 22 (thin dashed line), the second pixel electrode 31 (thick solid line) and the second opposite electrode 32 (thick dashed line) to 5V, for example. In addition, it is possible to change the gradation from a white to halftone, and then from halftone to a low gradation by changing the voltage applied to the first pixel electrode 21, such as decreasing the voltage between the first pixel electrode 21 and the first opposite electrode 22 from ±5V to ±3.5V and from ±3.5V to ±2V.

It is preferable that the extension directions (lengthwise directions) of the lower respective linear portions 23, 24 be orthogonal to the initial orientation direction 62. In this manner, it is possible to generate a first horizontal electric field in a direction parallel to the initial orientation direction 62; thus, it is possible to rotate the liquid crystal molecules 61 via the first horizontal electric field such that the liquid crystal molecules 61 are fixed in the initial orientation state (home position).

The initial orientation direction 62 may be slightly offset from the direction of the first horizontal electric field. The angle formed between the extension directions (lengthwise directions) of the respective linear portions 23, 24 and the initial orientation direction 62 may be greater than or equal to 75° and less than 90°, for example. However, in such cases, during black display, there is a possibility that when different voltages are continuously applied to the first pixel electrode 21 and the first opposite electrode 22, the liquid crystal molecules 61 will be continuously aligned in a direction slightly offset from the initial orientation direction 62, thus leading to light leakage. Therefore, in cases in which the initial orientation direction 62 is slightly offset from the direction of the first horizontal electric field, it is preferable to perform a reset operation to reset all of the voltages applied to the electrode pairs 20, 30 during a frame after the first frame of consecutive black frames or during the last frame of consecutive black frames. This is done in order to prevent light leakage during black display.

Hereafter, the liquid crystal panel 101 and the various components thereof will be explained in further detail.

In order to effectively shorten the falling periods, it is preferable that the gap between the first linear portion 23 and the second linear portion 24 (hereafter referred to as a first gap) and the gap between the third linear portion 33 and the fourth linear portion 34 (hereafter referred to as a second gap) respectively be less than or equal to 7 μm. In addition, it is even more preferable that the first gap and the second gap be less than or equal to 6 μm. In this manner, it is possible to realize a luminance greater than or equal to 250 cd/m², which is the luminance currently needed in ordinary tablet terminals.

There are no particular restrictions regarding the minimum size of the first and second gaps, but it is preferable that the first and second gaps respectively be greater than or equal to 2 μm, with greater than or equal to 3 μm being even more preferable, in order to prevent problems due to leaks and to prevent decreases in yield. If the gaps are less than 2 μm, there is a much greater chance of problems due to leakage and the like occurring.

The first and second gaps can be appropriately set independent of one another. They may be set to be the same size, or they may be set to differing sizes. However, in the present embodiment, the liquid crystal is actuated via the first horizontal electric field, which is generated between the first linear portion 23 and the second linear portion 24, and the second horizontal electric field, which is generated between the third linear portion 33 and the fourth linear portion 34. Thus, when there is large difference between the size of the first gap and the size of the second gap, voltage control becomes difficult. As a result, it is preferable that the first gap and the second gap be identical, or be of a similar size. More specifically, it is preferable that the difference between the first gap and the second gap be less than or equal to 4 μm, with 1 μm or less being even more preferable.

There are no particular restrictions regarding the widths of the respective linear portions 23, 24, 33, 34, but it is preferable that these widths be 2 μm to 5 μm, with 3 μm to 4 μm being even more preferable. However, while 5 μm or less falls within the acceptable range, there is a tendency for transmittance to decrease once the width exceeds 4 μm. In addition, when the width falls below 2 μm, disconnection may occur. The widths of the linear portions 23, 24, 33, 34 can be appropriately set independent of one another. They may be set to the same width, or they may be set to be differing widths.

In the present specification, "a width of a linear portion" refers to a length of the linear portion in a direction orthogonal to the extension direction (lengthwise direction) thereof.

There are no particular restrictions regarding the product (panel retardation) of a cell thickness "d" and a birefringence Δn (a value for light with a wavelength k), and this product can be set as appropriate. In addition, there are no particular restrictions regarding the viscosity of the liquid crystal in the liquid crystal layer 60, and the viscosity may be set as appropriate.

It is possible to appropriately use an ordinary backlight unit as the backlight unit 102 and an ordinary control unit as the control unit.

A pair of linearly polarizing plates can be used as the polarizing plates 71, 72. In such cases, the absorption axes of the pair of linearly polarizing plates are substantially orthogonal to one another.

The linearly polarizing plates respectively include a linearly polarizing element. A typical example of a linearly polarizing element is a material in which an anisotropic material such as a dichroic iodine complex or the like is adsorbed and oriented on a polyvinyl alcohol (PVA) film. In order to ensure mechanical strength and resistance to heat and moisture, the respective linearly polarizing plates usually further include a protective film such as a cellulose triacetate (TAC) film that has been laminated onto both surfaces of a PVA film with an adhesive layer interposed therebetween.

In order to further improve the viewing angle characteristics, an optical film, such as a retardation plate, may be provided between the array substrate 10 and the polarizing plate 71 and/or between the opposite substrate 50 and the polarizing plate 72.

The horizontal alignment films 41, 53 are seamlessly formed so as to least cover the entire display region. The respective horizontal alignment films 41, 53 can align nearby liquid crystal molecules 61 in a direction substantially parallel to the surface of the film. There are no particular restrictions regarding the materials used for the horizontal alignment films 41, 53. Alignment film materials used in an ordinary FFS mode can be used, for example. Furthermore, the horizontal alignment films 41, 53 may be an organic alignment film formed by using an organic material that includes a polyimide or the like, or may be an inorganic alignment film formed by using an inorganic material that includes a silicon oxide or the like. There are no particular restrictions regarding the method of alignment treatment for the horizontal alignment films 41, 53. The alignment treatment may be rubbing treatment, or may be photoalignment treatment, for example.

There are no particular restrictions regarding the materials for the first electrode pair 20 and the second electrode pair 30, and an ordinary conductive material can be used. An example of such a material is a transparent conductive material such as ITO, IZO, or the like.

There are no particular restrictions regarding the material used in the insulating layer 18. Examples of such a material include: an inorganic insulating material, such as a silicon nitride ($SiN_x$), in which the permittivity $\in$ is greater than or equal to 3 and less than or equal to 4; and an organic insulating material, such as a photosensitive acrylic resin, a photosensitive polyimide, or the like, in which the permittivity $\in$ is at least 7.

Ordinary materials can be used to form constituting components of the TFT array substrate 10 that are not mentioned above.

The color filter layer 52 includes a plurality of color layers (color filters) respectively provided so as to correspond to each sub-pixel. The color layers are used to perform color display. The color layers are formed from transparent organic insulating films, such as acrylic resins that contain pigments, or the like, and are usually formed within the sub-pixel region. This makes color display possible. The respective pixels are formed of three sub-pixels that respectively output R (red), G (green), and B (blue) colored light, for example. There are no particular restrictions regarding the type and number of colors in the sub-pixels forming the respective pixels, and these values may be set as appropriate. In other words, for example, each pixel may be formed of three sub-pixels that are respectively cyan, magenta, and yellow, or each pixel may be formed of four or more sub-pixels (four colors consisting of R, G, B, and Y (yellow), for example).

The color filter layer 52 may further include a black matrix (BM) layer that shields a region between adjacent sub-pixels. The BM layer can be formed from a non-transparent metallic film (a chromium film, for example) and/or a non-transparent organic film (an acrylic resin that contains carbon, for example).

In FIG. 2 and the like, for ease of description, each sub-pixel was shown to have three color layers of three different colors. In practice, only one color layer of one color is formed in one sub-pixel.

It is preferable that a transparent overcoat layer (not shown) be provided between the color filter layer 52 and the horizontal alignment film 53. By so doing, it is possible to flatten the surface on the liquid crystal layer 60 side of the opposite substrate 50. There are no particular restrictions regarding the material used in the overcoat layer. Examples of such a material include an organic insulating material, such as an acrylic resin or a polyimide, that has a permittivity $\in$ of greater than or equal to 3 and less than or equal to 4, or the like. Protrusions may be provided on the surface of the overcoat layer, and these protrusions may function as column-shaped spacers. An example of a method for providing protrusions in the overcoat layer is photolithography that utilizes a multitone photomask.

As mentioned above, the liquid crystal display device 100 of the present embodiment includes: the array substrate 10; the opposite substrate 50; and the liquid crystal layer 60 of a horizontal orientation type that is sandwiched between the array substrate 10 and the opposite substrate 50. The array substrate 10 includes: the first electrode pair 20 that applies the first horizontal electric field to the liquid crystal layer 60; the insulating layer 18 provided on the first electrode pair 20; and the second electrode pair 30 that is formed on the insulating layer 18 and that applies the second horizontal electric field to the liquid crystal layer 60. The first electrode pair 20 includes the first linear portion 23 and the second linear portion 24 that are provided with a gap therebetween. The second electrode pair 30 includes the third linear portion 33 and the fourth linear portion 34 provided with a gap therebetween. When the array substrate 10 is viewed in a plan view, the third linear portion 33 and the fourth linear portion 34 extend in a direction perpendicular to the first linear portion 23 and the second linear portion 24.

Thus, it is possible to generate the first and second horizontal electric fields in two different directions that are substantially orthogonal to each other as a result of the first electrode pair 20 and the second electrode pair 30. In addition, during rising periods, it is possible use the second horizontal electric field to rotate the liquid crystal molecules 61 in a direction away from the initial orientation direction 62. Meanwhile, during falling periods, it is possible to use the first horizontal electric field to help the liquid crystal molecules 61 return to the initial orientation state 62. In other words, it is possible to rotate the liquid crystal molecules 61 in a direction that approaches the initial orientation direction 62. Therefore, it is possible to control all gradation changes by applying voltage to the first electrode pair 20 and the second electrode pair 30, regardless of the viscosity of the liquid crystal; thus, it is possible to achieve a faster response speed during all gradation changes.

In addition, it is possible to rotate the liquid crystal molecules 61 in a plane that is substantially parallel to the array substrate 10 and the opposite substrate 50; thus, it is possible to realize wide viewing angle characteristics.

Hereafter, the results of simulations conducted regarding the liquid crystal display device 100 of the present embodiment will be explained. In the present specification, the respective simulations were conducted using an LCD-Master manufactured by Shintech Inc.

Working Example 1

Simulations were conducted regarding liquid crystal cells that had the structure shown in FIGS. 1 to 3. Positive-type liquid crystal, which had a birefringence $\Delta n$ of 0.1, a dielectric anisotropy $\Delta \in$ of 7, and a viscosity of 70 cP, was used. A retardation Re of the cells was set to 320 nm. Horizontal alignment films were disposed on respective liquid crystal layer side surfaces of the array substrate and the opposite substrate. The initial orientation of the liquid crystal molecules was a horizontal orientation. The first electrode pair, which included the first pixel electrode and the first opposite electrode, and the second electrode pair, which included the second pixel electrode and the second opposite electrode, were disposed on the array substrate side. The second electrode pair was disposed above the first electrode pair, and an insulating layer with a permittivity of 6.9 and thickness of 0.2 µm was disposed between the first electrode pair and the second electrode pair. The first pixel electrode included three first linear portions that extended in the left-right direction, and the first opposite electrode included two second linear portions that extended in parallel to the first linear portions. The first linear portions and the second linear portions were alternately disposed with gaps therebetween. The second pixel electrode included one third linear portion that extended in the up-down direction, and the second opposite electrode included two fourth linear portions that extended in parallel to the third linear portion. The third linear portion and the fourth linear portions were alternately disposed with gaps therebetween. The angle formed between the respective extension directions of the first linear portions and the second linear portions and the respective extension directions of the third linear portions and the fourth linear portions was set to 90°. A width L of the first, second, third, and fourth linear portions was set to 3 µm for all of the linear portions. A gap S between the first linear portion and the second linear portion, and a gap S between the third linear portion and the fourth linear portion, were both set to 3 µm. An angle formed between the initial orientation direction and the respective extension directions of the third linear portions and the fourth linear portions was set to 7°. A pair of polarizing plates were disposed in a crossed Nicols state. One transmission axis thereof was disposed parallel to the initial orientation direction, and another transmission axis was disposed orthogonal to the initial orientation direction. This resulted in the liquid crystal cells of the present working example being set to a normally black mode. In the opposite substrate, the color filter layer was disposed between the insulating substrate and the horizontal alignment film.

Working Example 2

The present working example is identical to Working Example 1, except that the gap S between the first linear portion and the second linear portion and the gap S between the third linear portion and the fourth linear portion were both set to 5 µm.

Working Example 3

The present working example is identical to Working Example 1, except that the gap S between the first linear portion and the second linear portion and the gap S between the third linear portion and the fourth linear portion were both set to 7 µm.

Comparative Example 1

Figure 6:
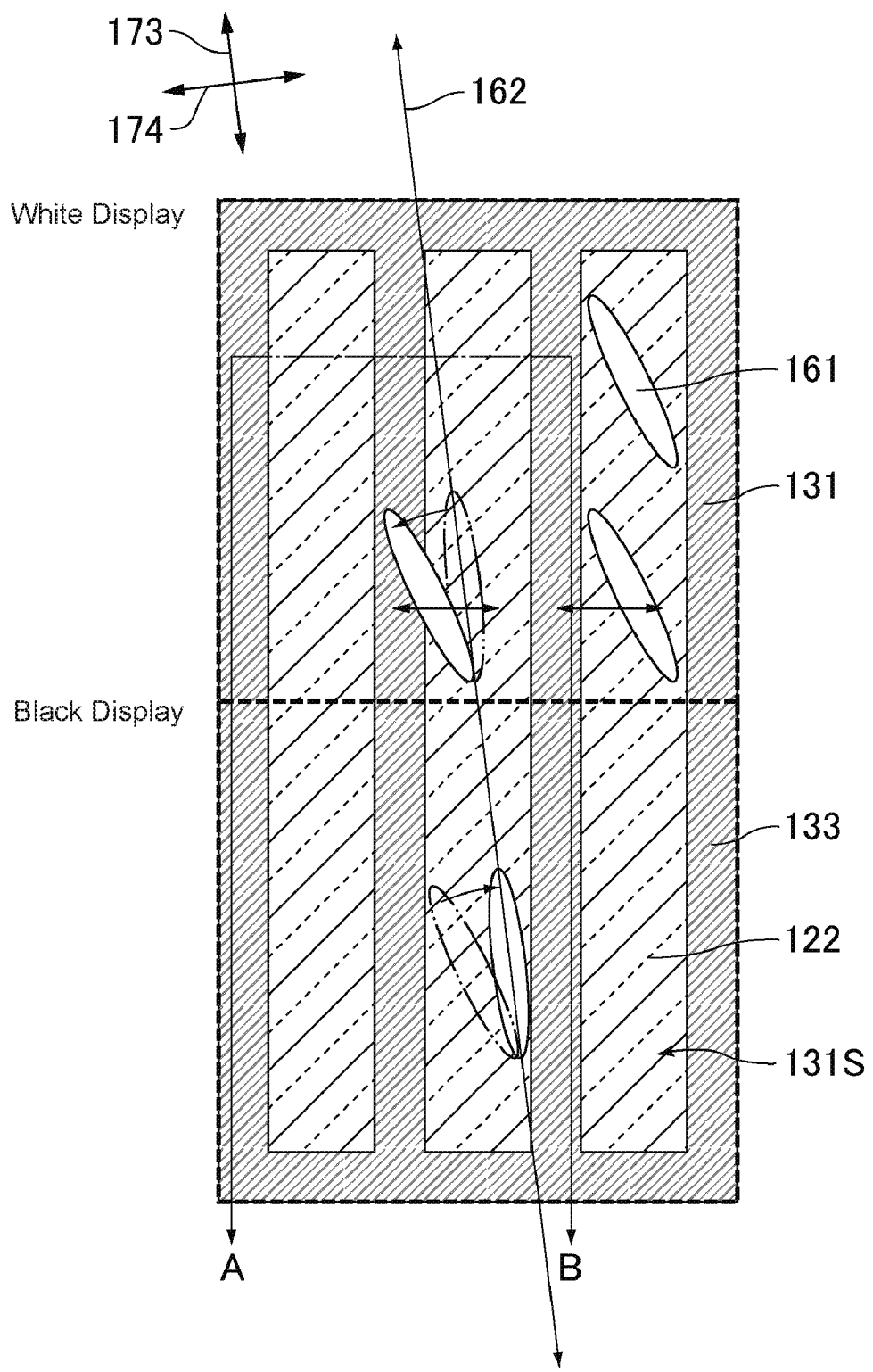
FIG. 6 is a schematic plan view of a liquid crystal cell of Comparative Example 1.
Figure 7:
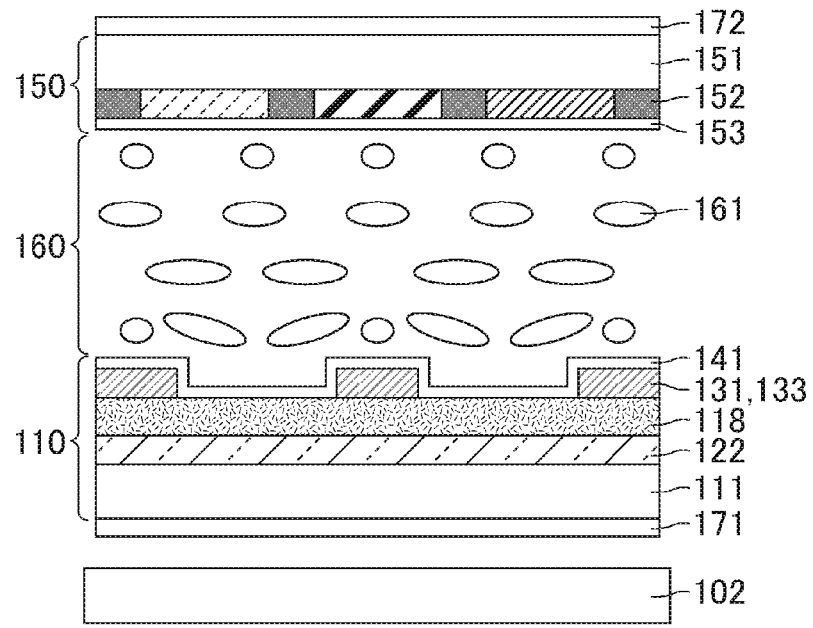
FIG. 7 is a schematic cross-sectional view of the liquid crystal cell of Comparative Example 1, and corresponds to a cross-section along a line A-B in FIG. 6.

FIG. 6 is a schematic plan view of a liquid crystal cell of Comparative Example 1. FIG. 7 is a schematic cross-sectional view of the liquid crystal cell of Comparative Example 1, and corresponds to a cross-section along the line A-B in FIG. 6. The upper half of FIG. 6 represents the state of the liquid crystal cell during a rising period, and the lower half of FIG. 6 represents a state of the liquid crystal cell during a falling period.

As shown in FIGS. 6 and 7, the liquid crystal cell of the present comparative example is an FFS mode liquid crystal cell. A liquid crystal layer 160 was formed using positive-type liquid crystal with a birefringence Δn of 0.1, a dielectric anisotropy Δ∈ of 7, and a viscosity of 70 cP. The cell retardation Re was set to 320 nm. Horizontal alignment films 141, 153 were respectively disposed on surfaces on a liquid crystal layer 160 side of an array substrate 110 and an opposite substrate 150. The initial orientation of liquid crystal molecules 161 was a horizontal orientation. A pixel electrode 131 and an opposite electrode 122 were disposed on an array substrate 110 side. The pixel electrode 131 was disposed above the opposite electrode 122, and an insulating layer 118 with a permittivity of 6.9 and a thickness of 0.2 μm was disposed between the pixel electrode 131 and the opposite electrode 122. The following may be used as the material in the insulating layer 118: an inorganic insulating material, such as a silicon nitride ($SiN_x$), with a permittivity ∈ of greater than or equal to 3 and less than or equal to 4; an organic insulating material, such as a photosensitive acrylic resin, a photosensitive polyimide, or the like, with a permittivity ∈ of at least 7; or the like. Three slits 131S that extend in the up-down direction were formed in the pixel electrode 131, and were disposed so as to provide gaps between the four linear portions 133 of the pixel electrode 131. A comb-shaped pixel electrode may be used in place of the pixel electrode 131 in which slits 131S have been formed. The opposite electrode 122 is seamlessly disposed in a rectangular shape in the entire sub-pixel region. A width L of the respective linear portions 133 was 3 μm for all of the linear portions, and gaps S between adjacent linear portions 133 (in other words, the width of the respective slits 131S) was 3 μm for each gap. The angle formed between the initial orientation direction 162 and the extension directions of the respective linear portions 133 was set to 7° when the long-axis direction of the liquid crystal molecules 161 was the same as the initial orientation direction 162 in a plan view when the device is turned OFF. A pair of polarizing plates 171, 172 were respectively disposed on insulating substrates 111, 151 in a crossed Nicols state. One transmission axis 173 was disposed so as to be parallel with the initial orientation direction 162, and another transmission axis 174 was disposed so as to be orthogonal to the initial orientation direction 162, resulting in the liquid crystal cell of the present comparative example being set to a normally-black mode. In the opposite substrate 150, a color filter layer 152 was disposed between the insulating substrate 151 and the horizontal alignment film 153.

The operation of the present comparative example will now be explained in more detail.

First, the operation of switching from OFF to ON will be explained. When differing voltages are applied to the pixel electrode 131 and the opposite electrode 122, a fringe electric field is generated between the upper pixel electrode 131 and the lower opposite electrode 122. At such time, the liquid crystal molecules 161 rotate away from the initial orientation direction 162, and switch from black display to white display. Next, the operation of switching from ON to OFF will be explained. When the pixel electrode 131 and the opposite electrode 122 are set so as to have the same potential, the fringe electric field dissipates, and the liquid crystal molecules 161 rotate so as to return to the initial orientation direction 162 (anchoring) as a result of the rotational elastic constant and viscosity of the liquid crystal.

Figure 8:
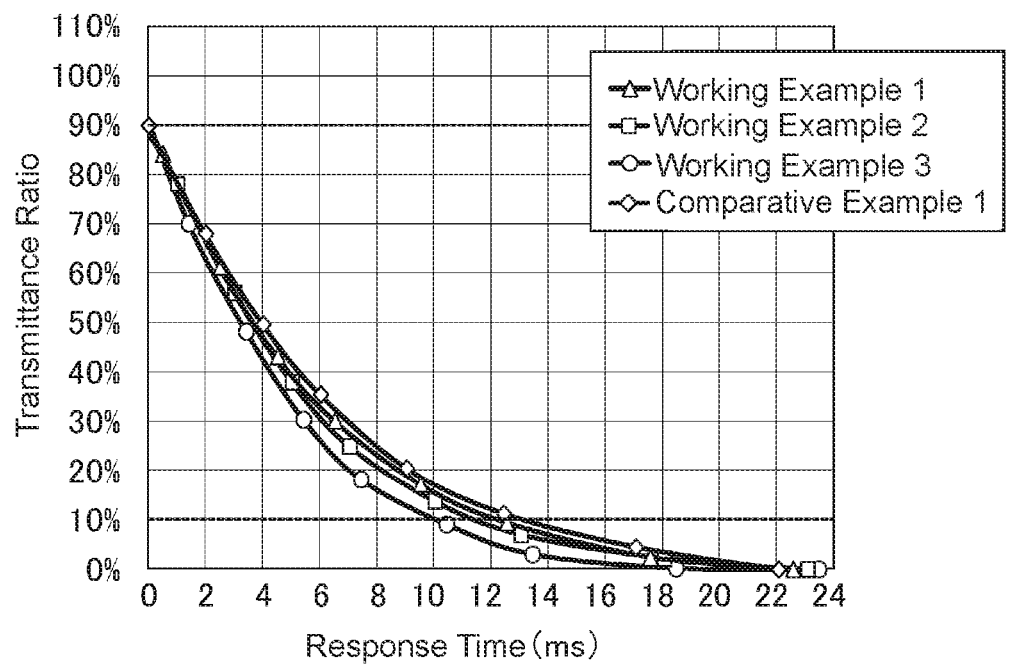
FIG. 8 is a graph that illustrates changes in the transmittance ratios of Working Examples 1 to 3 and Comparative Example 1.
Figure 9:
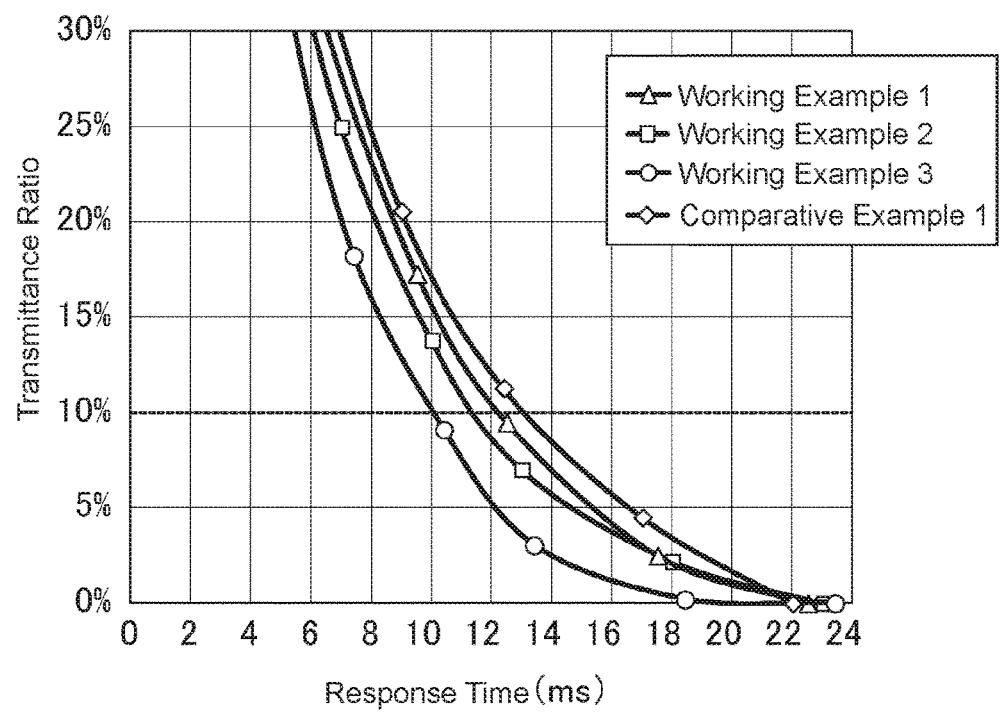
FIG. 9 is a graph that illustrates changes in the transmittance ratios of Working Examples 1 to 3 and Comparative Example 1, and that enlarges a portion of FIG. 8 in order to more clearly determine response characteristics during a falling period.

Next, the results of simulations that compared the optical responsiveness, or more specifically, the falling periods, of Working Examples 1 to 3 and Comparative Example 1 will be explained. FIGS. 8 and 9 are graphs that illustrate changes in the transmittance ratio of Working Examples 1 to 3 and Comparative Example 1. FIG. 9 enlarges a portion of FIG. 8 in order to more clearly determine response characteristics during falling periods.

A falling period (falling response) is defined as the amount of time for the transmittance ratio, or in other words, the transmittance when the maximum transmittance is 100%, to change from 90% to 10%. In the various graphs used to evaluate the falling periods, the response speed on the horizontal axis was set to 0 ms when the transmittance ratio was 90% in order to make it easier to compare the amount of time required for the transmittance ratio to change to 10%. In addition, in the respective working examples, the display device was changed from a state in which the first pixel electrode, the first opposite electrode, and the second opposite electrode were all set to 5V, and the second pixel electrode was set to ±5V with respect to the second opposite electrode, to a state in which the second pixel electrode, the first opposite electrode, and the second opposite electrode were all set to 5V, and the first pixel electrode was set to ±5V with respect to the first opposite electrode. In Comparative Example 1, the display device was changed from a state in which the opposite electrode was set to 5V and the pixel electrode was set to ±5V with respect to the opposite electrode to a state in which the pixel electrode and the opposite electrode were both set to 5V. Table 1 below shows the falling periods for Working Examples 1 to 3 and Comparative Example 1.

TABLE 1

| | Working Example 1 | Working Example 2 | Working Example 3 | Comparative Example 1 |
|---|---|---|---|---|
| Width of Gap Between Electrodes (μm) | L/S = 3/3 | L/S = 3/5 | L/S = 3/7 | L/S = 3/3 |
| Rising Period (ms) | 12.3 | 11.4 | 10.1 | 13.2 |

As shown in FIG. 8, FIG. 9, and Table 1, it was confirmed that it is possible to achieve a faster response speed in Working Examples 1 to 3 compared to Comparative Example 1. The results showed that responsiveness increased as the gap S between the linear portions became wider.

Figure 10:
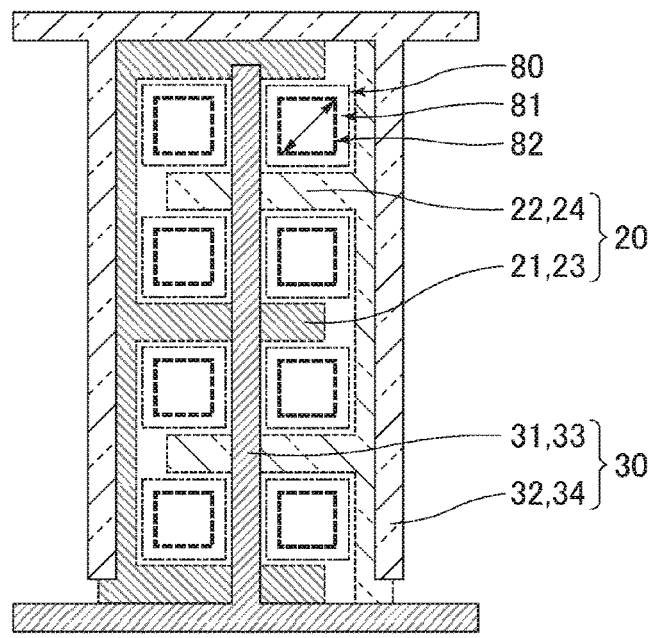
FIG. 10 is a schematic plan view of a sub-pixel in the liquid crystal display device of Embodiment 1.
Figure 11:
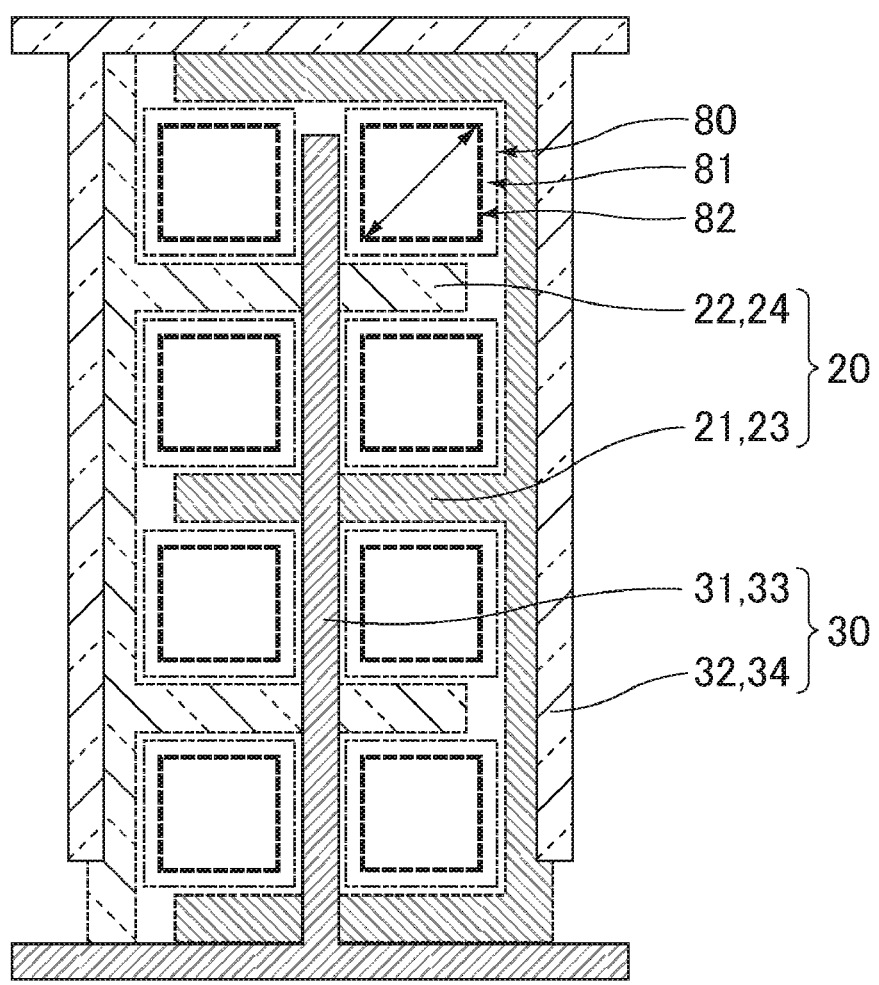
FIG. 11 is a schematic plan view of a sub-pixel in the liquid crystal display device of Embodiment 1.

FIGS. 10 and 11 are schematic plan views of a sub-pixel in the liquid crystal display device of Embodiment 1.

As shown in FIGS. 10 and 11, a region in which liquid crystal can be driven by the upper comb-shaped second electrode pair 30 and the lower comb-shaped first electrode pair 20 is ideally a square-shaped region 80 enclosed by the linear portions 23, 24, 33, 34. In reality, however, a difference in potential occurs between the lower electrode pair 20 and the upper electrode pair 30, which leads to the formation of a frame-shaped region 81, in which it is difficult to generate an electric field in the liquid crystal layer 60, along the outer edges of the region 80. Responsiveness is poor within the region 81; thus a region 82, which can contribute to optical modulation and which can improve responsiveness by actively generating an electric field within the liquid crystal layer, is smaller than the region 80 (in other words, equal to the region 80 minus the region 81). When the gap between the linear portions 23, 24 and the gap between the linear portions 33, 34 become smaller, the occupancy of the region 81 within the region 80 increases, while the occupancy of the region 82 within the region 80 decreases. When the gap between the linear portions 23, 24 and the gap between the linear portions 33, 34 become larger, the occupancy of the region 81 within the region 80 decreases, while the occupancy of the region 82 within the region 80 increases. Thus, when the gap between the linear portions 23 and 24 and the gap between the linear portions 33, 34 become larger, optical responsiveness improves.

Embodiment 2

The present embodiment is substantially identical to Embodiment 1, except that the liquid crystal layer and the initial orientation direction are different. Therefore, in the present embodiment, mainly the characteristics particular to the present embodiment will be described, and explanations covered in Embodiment 1 will be omitted. Furthermore, members having the same or similar function in both the present embodiment and Embodiment 1 will have the same reference character in both embodiments, and descriptions thereof will be omitted in the present embodiment.

Figure 12:
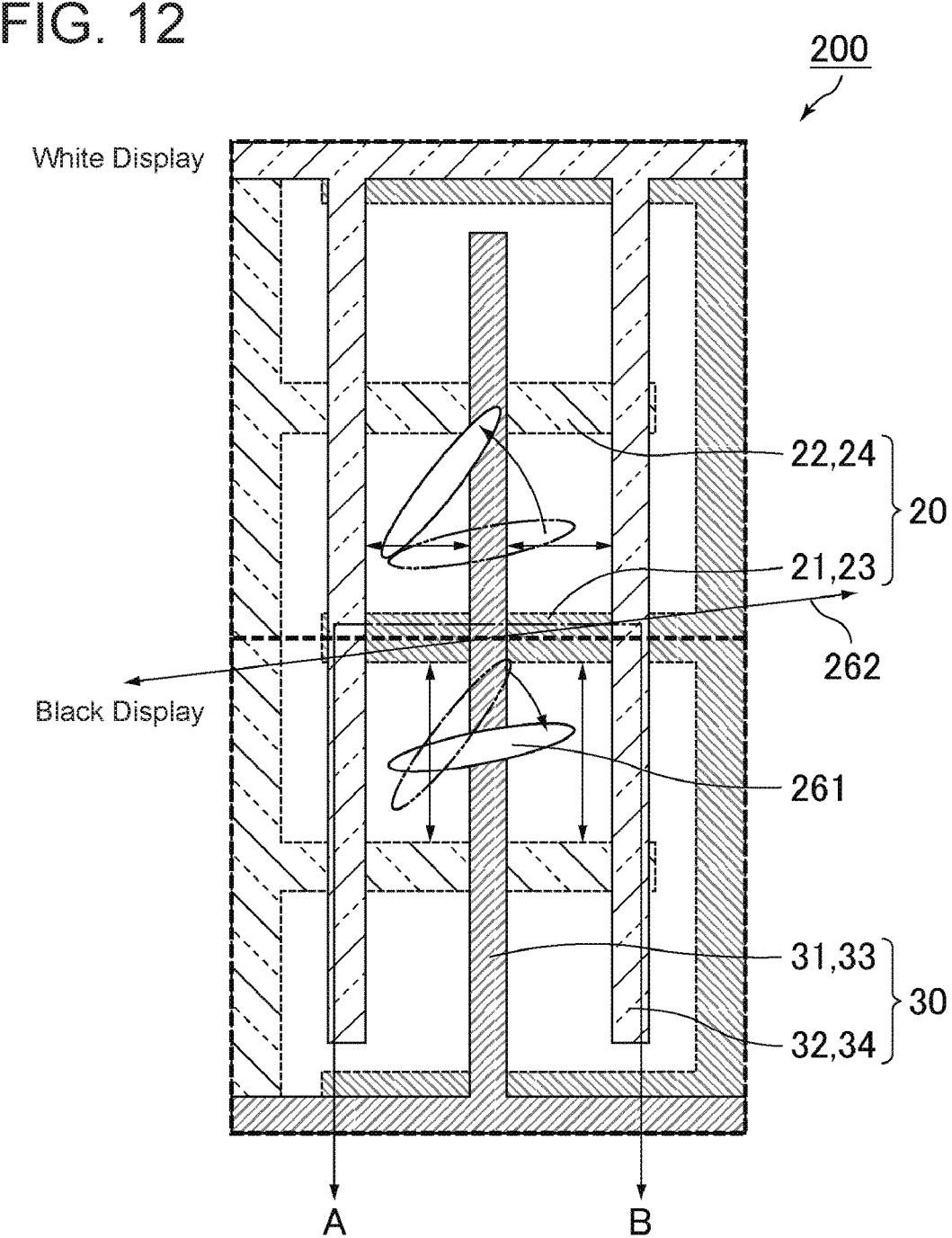
FIG. 12 is a schematic plan view of a sub-pixel in a liquid crystal display device of Embodiment 2.
Figure 13:
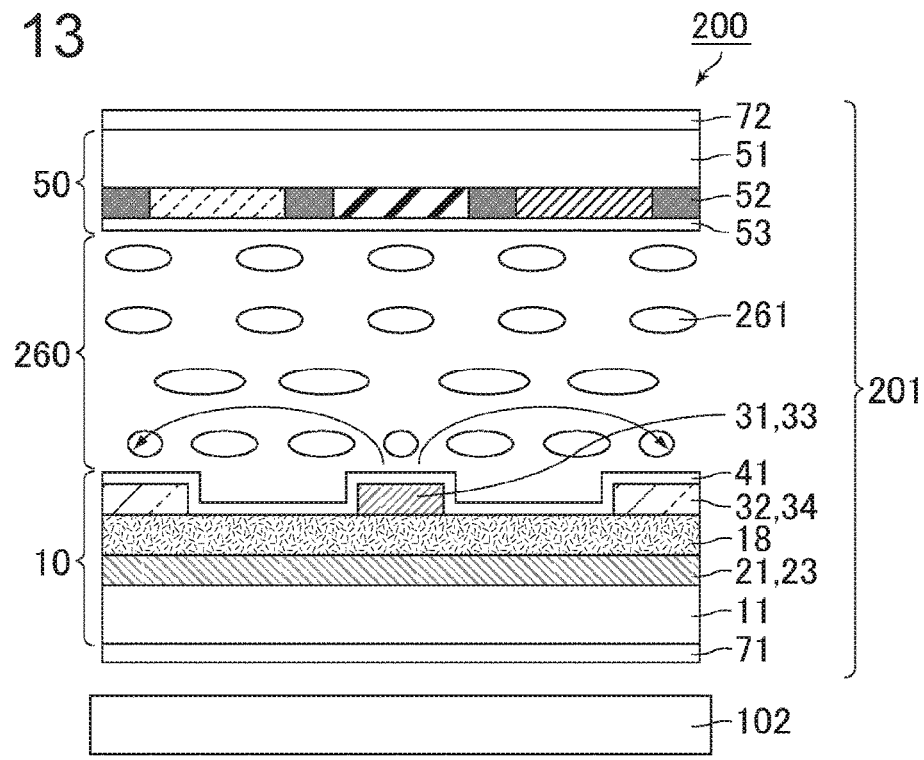
FIG. 13 is a schematic cross-sectional view of the liquid crystal display device of Embodiment 2, and corresponds to a cross-section along a line A-B in FIG. 12.

FIG. 12 is a schematic plan view of a sub-pixel in a liquid crystal display device of Embodiment 2. FIG. 13 is a schematic cross-sectional view of the liquid crystal display device of Embodiment 2, and corresponds to a cross-section along the line A-B in FIG. 12. The upper half of FIG. 12 shows the state of the device during a rising period, while the lower half of FIG. 12 shows the state of the device during a falling period.

As shown in FIGS. 12 and 13, a liquid crystal display device 200 according to the present embodiment includes a liquid crystal panel 201 instead of the liquid crystal panel 101. The liquid crystal panel 201 is substantially identical to the liquid crystal panel 101, except that the liquid crystal layer and the initial orientation direction are different.

The liquid crystal panel 201 has a liquid crystal layer 260 sandwiched between the array substrate 10 and the opposite substrate 50. Nematic liquid crystal that has a negative dielectric anisotropy ($\Delta\in$<0) is used as the material for the liquid crystal layer 260. There are no particular restrictions regarding a specific dielectric anisotropy $\Delta\in$ of the nematic liquid crystal; however, it is preferable that the dielectric anisotropy $\Delta\in$ be greater than or equal to −8 and less than or equal to −3.

When the initial orientation direction 262 is the same as the long axis direction of liquid crystal molecules 261 in a plan view when an electric field has not been generated within the liquid crystal layer 260 by the electrode pairs 20, 30 (hereafter referred to as a non-electric field period), it is preferable that an angle formed between the initial orientation direction 262 and a direction orthogonal to the respective linear portions 33, 34 be less than or equal to 15°, with 7° or less being more preferable and 1° or less being even more preferable. In addition, it is preferable that an angle formed between the initial orientation direction 262 and a direction orthogonal to the respective linear portions 33, 34 be greater than or equal to 1°.

Also in the present embodiment, the first horizontal electric field, which is substantially parallel to the respective main surfaces of the substrates 10, 50, is generated between the first pixel electrode 21 and the first opposite electrode 22. The first horizontal electrode field is generated in a direction substantially orthogonal to the extension directions (lengthwise directions) of the first linear portion 23 and the second linear portion 24. Furthermore, the second horizontal electric field, which is substantially parallel to the respective main surfaces of the substrates 10, 50, is generated between the second pixel electrode 31 and the second opposite electrode 32. The second horizontal electrode field is generated in a direction substantially orthogonal to the extension directions (lengthwise directions) of the third linear portion 33 and the fourth linear portion 34, and is substantially orthogonal to the first horizontal electric field.

By applying the first or the second horizontal electric field to the liquid crystal layer 260, it is possible to rotate the liquid crystal molecules 261, which have a negative dielectric anisotropy, in a plane substantially parallel to the respective main surfaces of the substrates 10, 50. When the second horizontal electric field is applied, the liquid crystal molecules 261, which have a negative dielectric anisotropy, rotate such that the long-axis direction thereof moves away from the direction of the second horizontal electric field (lines of electric force), or in other words, rotate such that the long-axis direction moves away from the initial orientation direction 262. Meanwhile, when the first horizontal electric field is applied, the liquid crystal molecules 261, which have a negative dielectric anisotropy, rotate such that the long-axis direction thereof moves away from the direction of the first horizontal electric field (lines of electric force), or in other words, rotates such that the long-axis direction approaches the initial orientation direction 262. Therefore, as in Embodiment 1, it is possible in the present embodiment to control all changes in gradation by applying voltage to the first electrode pair 20 and the second electrode pair 30, regardless of the properties, such as viscosity, of the liquid crystal. Thus, it is possible to achieve a faster response speed during all gradation changes.

It is preferable that the extension directions (lengthwise directions) of the lower respective linear portions 23, 24 be parallel to the initial orientation direction 262. In this manner, it is possible to generate the first horizontal electric field in a direction orthogonal to the initial orientation direction 262; thus it is possible to use the first horizontal electric field to rotate the liquid crystal molecules 261 so as to be fixed in the initial orientation state (home position).

The direction orthogonal to the initial orientation direction 262 may be slightly offset from the direction of the first horizontal electric field, and an angle formed between the initial orientation direction 262 and the extension directions (lengthwise directions) of the respective linear portions 23, 24 may be greater than 0° and less than or equal to 15°, for example. However, in such cases, it is preferable to perform a reset operation to reset all of the voltages applied to the electrode pairs 20, 30 during a frame after the first frame of consecutive black frames or during the last frame of consecutive black frames. This is done for the same reason as in Embodiment 1.

Hereafter, the results of simulations conducted regarding the liquid crystal display device 200 will be explained.

Working Example 4

Simulations were conducted regarding liquid crystal cells having the structure shown in FIGS. 12 and 13.

Negative-type liquid crystal, which had a birefringence $\Delta n$ of 0.1, a dielectric anisotropy $\Delta\in$ of −7, and a viscosity of 70 cP, was used. The angle between the initial orientation direction and a direction orthogonal to the respective extension directions of the third linear portion and the fourth linear portion, or in other words, the respective extension directions of the first linear portion and the second linear portion, was set at 7°. Other than the above-mentioned conditions, Working Example 4 is the same as Working Example 1.

Working Example 5

The present working example is the same as Working Example 4, except that the gap S between the first linear portion and the second linear portion and the gap S between the third linear portion and the fourth linear portion were both set at 5 µm.

Working Example 6

The present working example is the same as Working Example 4, except that the gap S between the first linear portion and the second linear portion and the gap S between the third linear portion and the fourth linear portion were both set at 7 µm.

Figure 14:
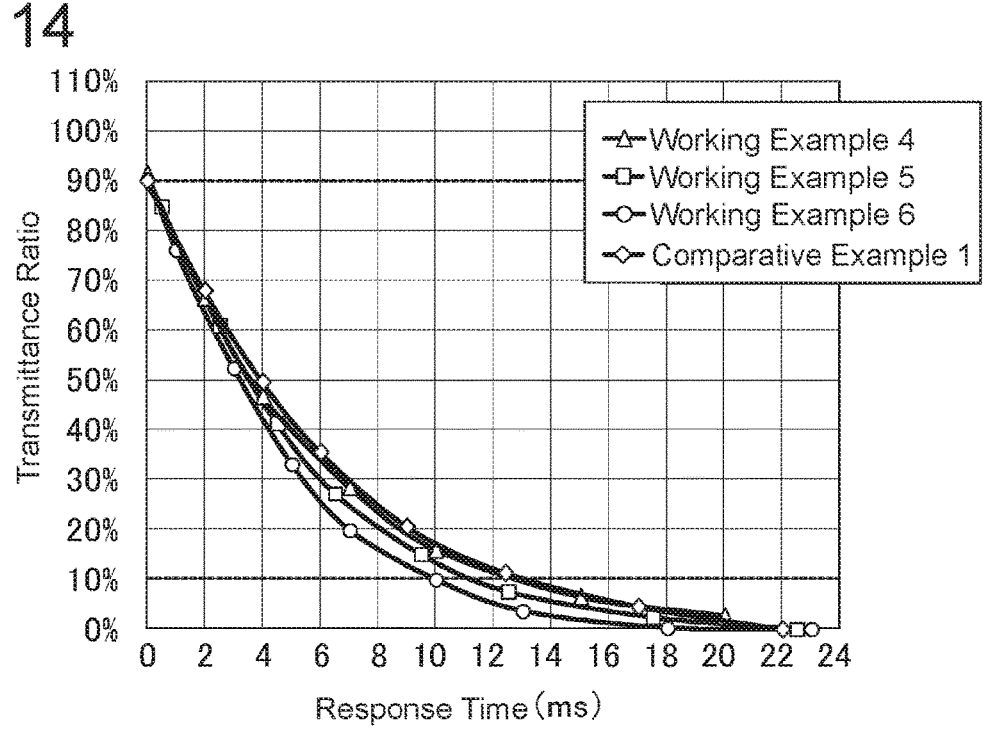
FIG. 14 is a graph that illustrates changes in the transmittance ratios of Working Examples 4 to 6 and Comparative Example 1.
Figure 15:
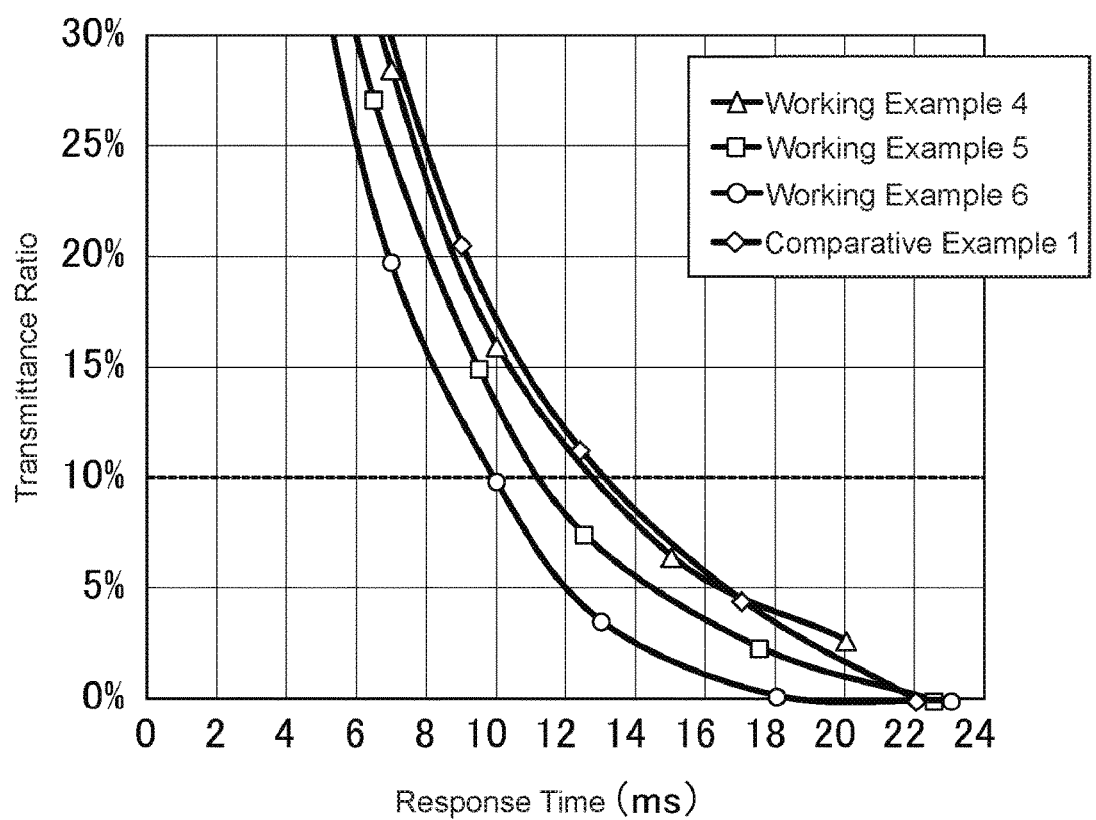
FIG. 15 is a graph that illustrates changes in the transmittance ratios of Working Examples 4 to 6 and Comparative Example 1, and that enlarges a portion of FIG. 14 in order to more clearly determine response characteristics during a falling period.

Next, the results of simulations that compared the optical responsiveness, or more specifically, the falling periods, of Working Examples 4 to 6 and Comparative Example 1 will be explained. The method of measuring the falling period is the same as that mentioned above. FIGS. 14 and 15 are graphs that illustrate changes in the transmittance ratio of Working Examples 4 to 6 and Comparative Example 1. FIG. 15 enlarges a portion of FIG. 14 in order to more clearly determine response characteristics during falling periods. Table 2 below shows the falling periods for Working Examples 4 to 6 and Comparative Example 1.

TABLE 2

|  | Working Example 4 | Working Example 5 | Working Example 6 | Comparative Example 1 |
|---|---|---|---|---|
| Width of Gap Between Electrodes (µm) | L/S = 3/3 | L/S = 3/5 | L/S = 3/7 | L/S = 3/3 |
| Rising Period (ms) | 12.8 | 11.2 | 9.9 | 13.2 |

As shown in FIG. 14, FIG. 15, and Table 2, it was confirmed that it is possible to achieve a faster response speed in Working Examples 4 to 6, which used negative-type liquid crystal, compared to Comparative Example 1. Furthermore, as in Working Examples 1 to 3, which used positive-type liquid crystal, the results showed that responsiveness improved as the gap S between the linear portions became larger.

From the results of Working Examples 1 to 6, it was learned that responsiveness improved as the gap S between linear portions became larger, regardless of whether the liquid crystal was positive-type or negative-type. However, white voltage (the voltage during white display) is set to a prescribed value in ordinary commercially available portable terminals. Thus, when the voltage during white display is set to a common value (the above-mentioned ±5V, for example) in Working Examples 1 to 6, the strength of the electric field applied to the liquid crystal layer decreases as the gap S between the linear portions becomes larger. This means that there will be a decrease in the maximum luminance.

Figure 16:
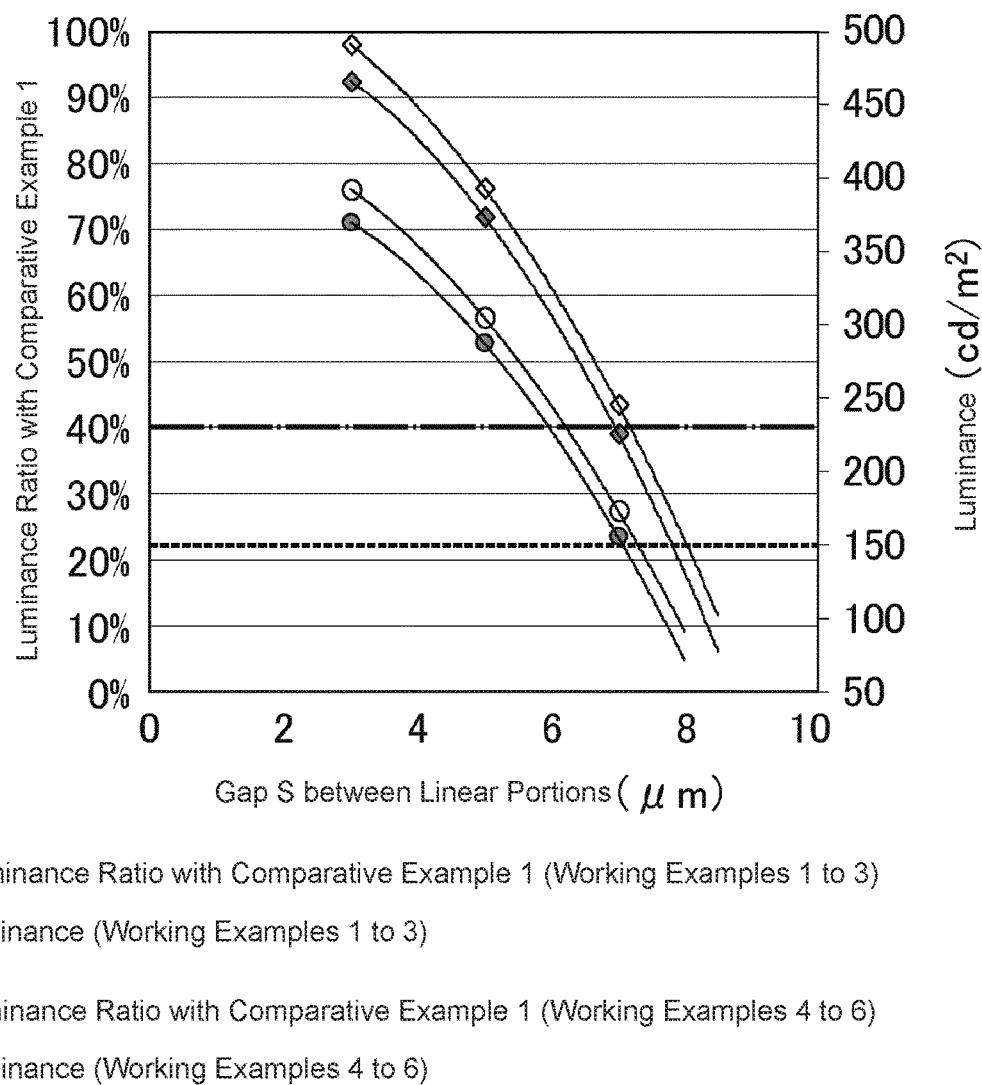
FIG. 16 is a graph that shows the luminance of Working Examples 1 to 6, and the luminance ratios of Working Examples 1 to 6 to Comparative Example 1.

FIG. 16 is a graph that shows the luminance of Working Examples 1 to 6, and the luminance ratios of Working Examples 1 to 6 with respect to Comparative Example 1.

As shown in FIG. 16, when the gap S between linear portions increases from 3 µm to 7 µm, the luminance ratios with respect to Comparative Example 1 decrease to approximately 40%. This indicates that the luminance decreases from 400 cd/m², which is the setting in an ordinary portable terminal, to 150 cd/m², which a viewer would find to be disagreeable since the display would be somewhat dark and hard to see. Thus, in consideration of product quality, it is preferable that the luminance ratio with respect to Comparative Example 1 be greater than or equal to 40% and that the luminance be greater than or equal to 150 cd/m². As a result, it is preferable that the gap S between linear portions be less than or equal to 7 µm.

The results of additional simulations conducted regarding the liquid crystal display device 100 of Embodiment 1 will be explained below.

Working Example 7

Figure 17:
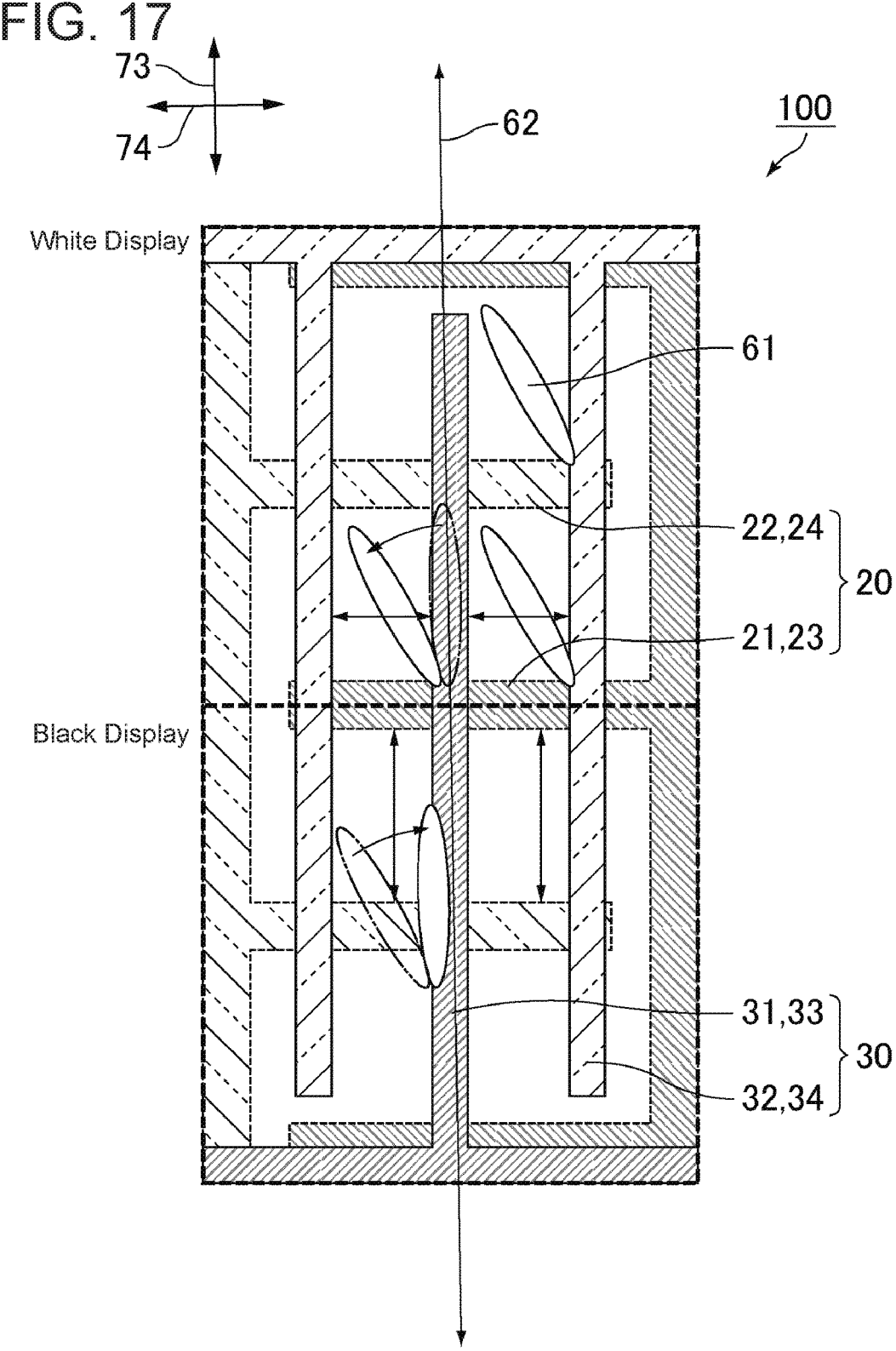
FIG. 17 is a schematic plan view of a liquid crystal cell of Working Example 7.

FIG. 17 is a schematic plan view of a liquid crystal cell of Working Example 7. The upper half of FIG. 17 shows the state of the device during a rising period, while the lower half of FIG. 17 shows the state of the device during a falling period.

As shown in FIG. 17, the present working example is identical to Working Example 1, except that the angle formed between the initial orientation direction 62 and the respective extension directions of the third linear portion 33 and the fourth linear portion 34 has been modified to 1°.

Working Example 8

Figure 18:
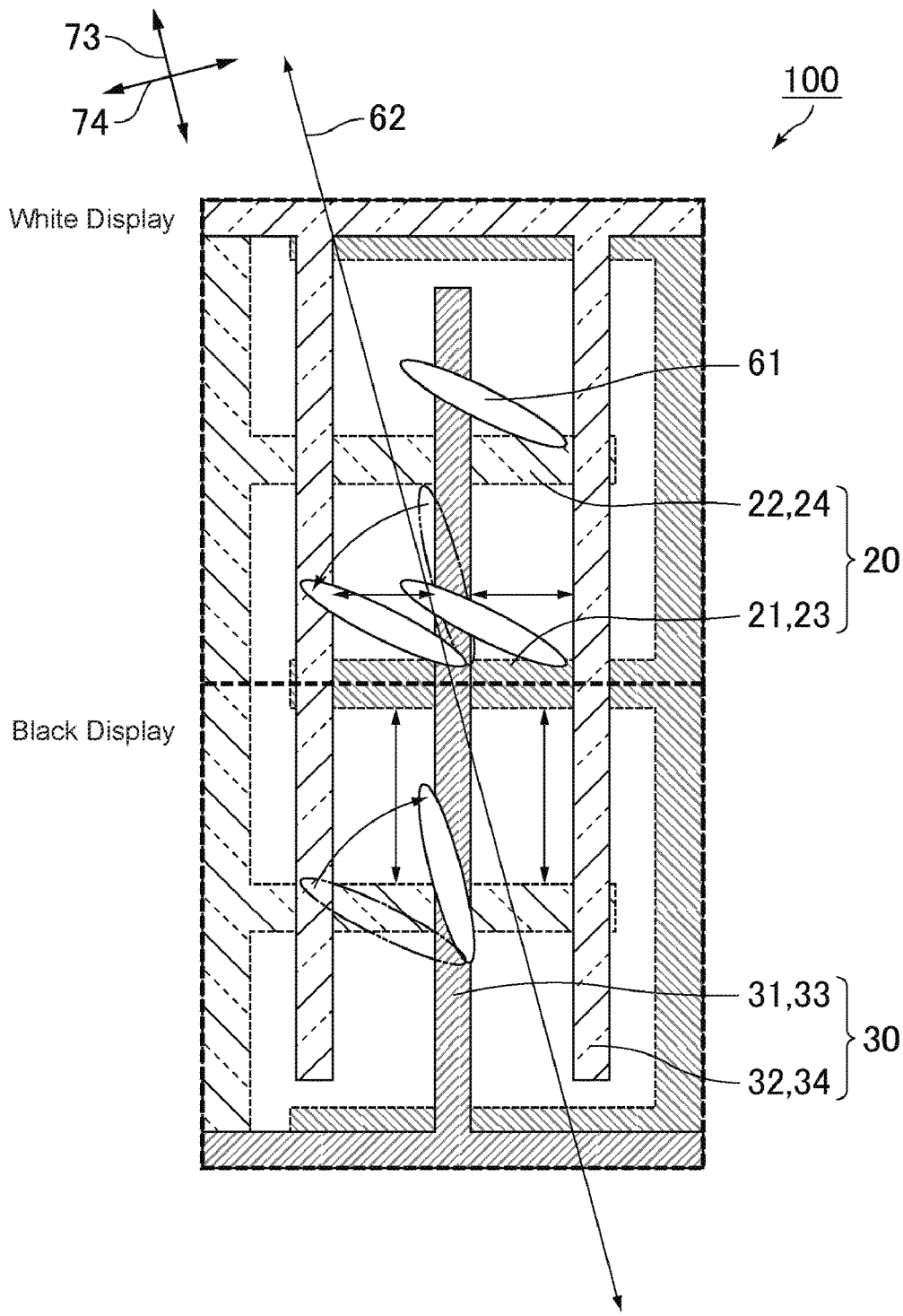
FIG. 18 is a schematic plan view of a liquid crystal cell of Working Example 8.

FIG. 18 is a schematic plan view of a liquid crystal cell of Working Example 8. The upper half of FIG. 18 shows the state of the device during a rising period, while the lower half of FIG. 18 shows the state of the device during a falling period.

As shown in FIG. 18, the present working example is identical to Working Example 1 except that the angle formed between the initial orientation direction 62 and the respective extension directions of the third linear portion 33 and the fourth linear portion 34 has been modified to 15°.

Working Example 9

Figure 19:
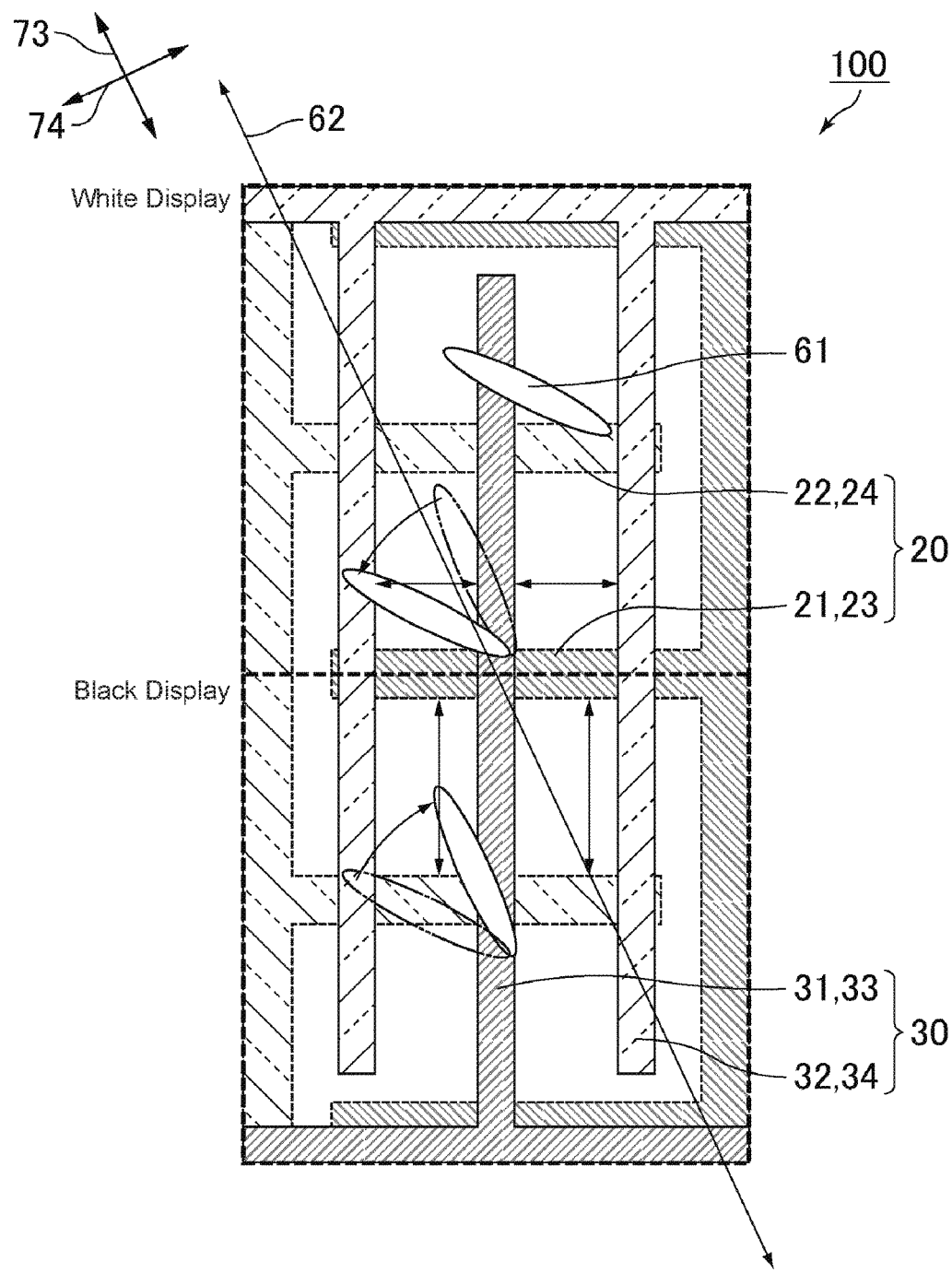
FIG. 19 is a schematic plan view of a liquid crystal cell of Working Example 9.

FIG. 19 is a schematic plan view of a liquid crystal cell of Working Example 9. The upper half of FIG. 19 shows the state of the device during a rising period, while the lower half of FIG. 19 shows the state of the device during a falling period.

As shown in FIG. 19, the present working example is identical to Working Example 1, except that the angle formed between the initial orientation direction 62 and the respective extension directions of the third linear portion 33 and the fourth linear portion 34 has been modified to 25°.

Figure 20:
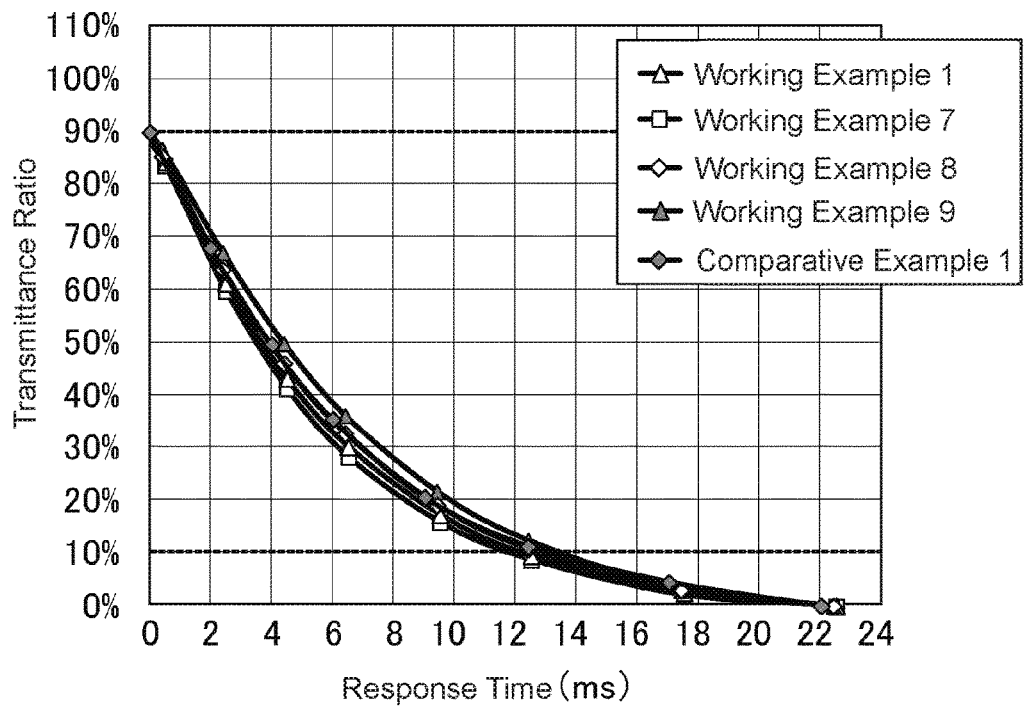
FIG. 20 is a graph that illustrates changes in the transmittance ratios of Working Example 1, Working Examples 7 to 9, and Comparative Example 1.
Figure 21:
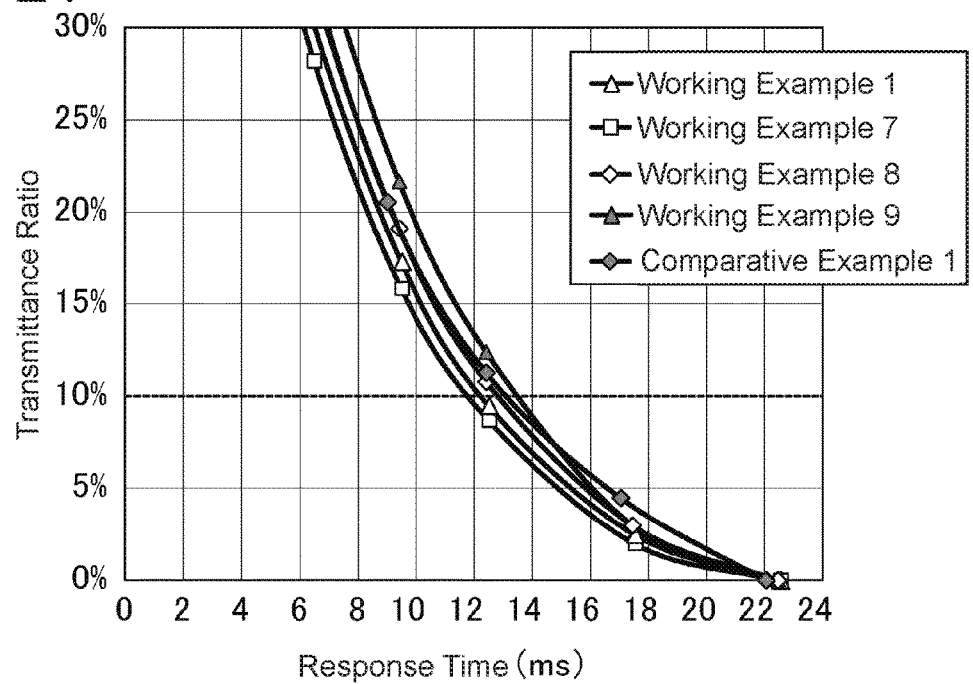
FIG. 21 is a graph that illustrates changes in the transmittance ratios of Working Example 1, Working Examples 7 to 9, and Comparative Example 1, and that enlarges a portion of FIG. 20 in order to more clearly determine response characteristics during a falling period.

Next, results of simulations that compared the optical responsiveness, or more specifically, the falling periods, of Working Examples 1, Working Examples 7 to 9, and Comparative Example 1 will be explained. The method of measuring the falling period is the same as that mentioned above. FIGS. 20 and 21 are graphs that show changes in the transmittance ratios for Working Example 1, Working Examples 7 to 9, and Comparative Example 1. FIG. 21 enlarges a portion of FIG. 20 in order to more clearly determine response characteristics during a falling period. Table 3 below shows the falling periods for Working Example 1, Working Examples 7 to 9, and Comparative Example 1.

TABLE 3

|  | Working Example 7 | Working Example 1 | Working Example 8 | Working Example 9 | Comparative Example 1 |
|---|---|---|---|---|---|
| Width of Gap Between Electrodes (μm) | L/S = 3/3 | L/S = 3/3 | L/S = 3/3 | L/S = 3/3 | L/S = 3/3 |
| Angle with Initial Orientation Direction | 1° | 7° | 15° | 25° | 7° |
| Rising Period (ms) | 11.8 | 12.3 | 12.8 | 13.4 | 13.2 |

As shown in FIG. 20, FIG. 21, and Table 3, it was confirmed that it is possible to achieve a faster response speed in Working Examples 1, 7, and 8 compared to Comparative Example 1. In addition, Working Example 9, which had a large angle of 25° between the initial orientation direction 62 and the respective extension directions of the third linear portion 33 and the fourth linear portion 34, had responsiveness similar to that of Comparative Example 1. This is due to the fact that the initial orientation direction 62 corresponds to the direction of the first horizontal electric field generated by the first linear portion 23 and the second linear portion 24 when the initial orientation direction 62 is parallel to the respective extension directions of the third linear portion 33 and the fourth linear portion 34, and the fact that when the angle between the initial orientation direction 62 and the respective extension directions of the third linear portion 33 and the fourth linear portion 34 becomes smaller, it becomes easier to return the liquid crystal molecules to the initial orientation direction 62.

From these results, it was learned that, in order to effectively decrease the duration of the falling periods, it is preferable that the angle formed between the initial orientation direction 62 and the respective extension directions of the third linear portion 33 and the fourth linear portion 34 be less than or equal to 15°.

In the above-described Embodiments 1 and 2, examples were used in which liquid crystal was driven by the upper second electrode pair during rising periods and was driven by the lower first electrode pair during falling periods. This configuration may be reversed, however. In other words, the liquid crystal may be driven by the lower first electrode pair during rising periods and driven by the upper second electrode pair during falling periods. In such cases, however, it is necessary to rotate the initial orientation direction 90° from the respective directions mentioned above.

In addition, the liquid crystal display devices of Embodiments 1 and 2 may be a monochrome liquid crystal display device, and may be configured such that each pixel is not divided into a plurality of sub-pixels.

DESCRIPTION OF REFERENCE CHARACTERS 10 array substrate
11 insulating substrate
12 gate bus line
13 common wiring line
14 first source bus line
15 second source bus line
16 first TFT
17 second TFT
18 insulating layer
20 first electrode pair
21 first pixel electrode
22 first opposite electrode
23 first linear portion
24 second linear portion
30 second electrode pair
31 second pixel electrode
32 second opposite electrode
33 third linear portion
34 fourth linear portion
41, 53 horizontal alignment film
42, 43, 44 contact hole
50 opposite substrate
51 insulating substrate
52 color filter layer
60, 260 liquid crystal layer
61, 261 liquid crystal molecule
62, 262 initial orientation direction
71, 72 polarizing plate
73, 74 transmission axis
80, 81, 82 region
100, 200 liquid crystal display device
101, 201 liquid crystal panel
102 backlight unit

What is claimed is:

1. A liquid crystal display device, comprising:
a first substrate;
a second substrate facing the first substrate; and
a liquid crystal layer of a horizontal orientation type that is sandwiched between the first substrate and the second substrate,
wherein the first substrate includes a first electrode pair that applies a first horizontal electric field to the liquid crystal layer, an insulating layer provided on the first electrode pair, and a second electrode pair that is provided on the insulating layer and that applies a second horizontal electric field to the liquid crystal layer,
wherein the first electrode pair includes a first linear electrode and a second linear electrode provided with a gap therebetween,
wherein the second electrode pair includes a third linear electrode and a fourth linear electrode provided with a gap therebetween,
wherein, in a plan view of the first substrate, the third linear electrode and the fourth linear electrode extend in a direction perpendicular with respect to the first linear electrode and the second linear electrode, and
wherein, in the plan view, a portion of the first electrode pair and a portion of the second electrode pair overlap with each other with the insulating layer interposed therebetween.

2. The liquid crystal display device according to claim 1, wherein the liquid crystal layer includes liquid crystal having a positive dielectric anisotropy.

3. The liquid crystal display device according to claim 2, wherein an initial orientation direction of liquid crystal molecules included in the liquid crystal layer forms an angle of 15° or less with respect to respective extension directions of the first linear electrode and the second linear electrode or respective extension directions of the third linear electrode and the fourth linear electrode.

4. The liquid crystal display device according to claim 3,
wherein the gap between the first linear electrode and the second linear electrode is 7 μm or less, and
wherein the gap between the third linear electrode and the fourth linear electrode is 7 μm or less.

5. The liquid crystal display device according to claim 2,
wherein the gap between the first linear electrode and the second linear electrode is 7 μm or less, and
wherein the gap between the third linear electrode and the fourth linear electrode is 7 μm or less.

6. The liquid crystal display device according to claim 1, wherein the liquid crystal layer includes liquid crystal having a negative dielectric anisotropy.

7. The liquid crystal display device according to claim 6,
wherein the gap between the first linear electrode and the second linear electrode is 7 μm or less, and
wherein the gap between the third linear electrode and the fourth linear electrode is 7 μm or less.

8. The liquid crystal display device according to claim 1,
wherein the gap between the first linear electrode and the second linear electrode is 7 μm or less, and
wherein the gap between the third linear electrode and the fourth linear electrode is 7 μm or less.

* * * * *